United States Patent
Kurtz et al.

(10) Patent No.: US 8,867,782 B2
(45) Date of Patent: Oct. 21, 2014

(54) SPECTRAL EDGE MARKING FOR STEGANOGRAPHY OR WATERMARKING

(75) Inventors: Andrew F. Kurtz, Macedon, NY (US); Kurt M. Schroeder, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 200 days.

(21) Appl. No.: 13/526,803

(22) Filed: Jun. 19, 2012

(65) Prior Publication Data

US 2013/0336525 A1 Dec. 19, 2013

(51) Int. Cl.
*G06K 9/00* (2006.01)

(52) U.S. Cl.
USPC .......................................... 382/100; 382/103

(58) Field of Classification Search
CPC ........... G06T 1/0021; G06T 2201/005; H04N 2201/327; H04N 1/32144; H04N 1/32352
USPC .......................................................... 382/100
See application file for complete search history.

(56) References Cited

U.S. PATENT DOCUMENTS

| | | | |
|---|---|---|---|
| 5,383,995 A | 1/1995 | Phillips et al. | |
| 5,542,971 A * | 8/1996 | Auslander et al. | 106/31.15 |
| 5,790,703 A * | 8/1998 | Wang | 358/3.28 |
| 5,859,920 A | 1/1999 | Daly et al. | |
| 6,149,719 A * | 11/2000 | Houle | 106/31.14 |
| 6,361,916 B1 | 3/2002 | Chen et al. | |
| 6,522,767 B1 | 2/2003 | Moskowitz | |
| 6,567,532 B1 | 5/2003 | Honsinger | |
| 6,603,864 B1 * | 8/2003 | Matsunoshita | 382/100 |
| 6,683,966 B1 | 1/2004 | Tian et al. | |
| 6,706,460 B1 | 3/2004 | Williams et al. | |
| 6,718,046 B2 * | 4/2004 | Reed et al. | 382/100 |
| 6,813,369 B2 * | 11/2004 | Oki | 382/100 |
| 6,912,674 B2 * | 6/2005 | Trelewicz et al. | 714/44 |
| 6,940,993 B2 | 9/2005 | Jones et al. | |
| 6,996,252 B2 * | 2/2006 | Reed et al. | 382/100 |
| 7,218,750 B1 * | 5/2007 | Hiraishi et al. | 382/100 |
| 7,926,730 B2 * | 4/2011 | Auslander et al. | 235/494 |
| 8,064,100 B2 * | 11/2011 | Braun et al. | 358/1.9 |
| 8,223,380 B2 * | 7/2012 | Lapstun et al. | 358/1.15 |
| 2002/0063879 A1 * | 5/2002 | Zeman | 358/1.14 |
| 2012/0218608 A1 * | 8/2012 | Maltz et al. | 358/3.28 |
| 2013/0222905 A1 * | 8/2013 | Kurtz et al. | 359/464 |

OTHER PUBLICATIONS

Cox et al.; Digital Watermarking, Morgan Kaufmann Publishers, 2002.

(Continued)

*Primary Examiner* — Utpal Shah
(74) *Attorney, Agent, or Firm* — Nelson Adrian Blish

(57) ABSTRACT

A system for detecting visibly hidden content on a print media (200) in which image content is printed with one or more normal printing process visible colorants (340), and which further includes embedded hidden data (220) printed with spectral edge markers (320). These spectral edge marker materials (320) have a substantial spectral absorption just outside the human visible spectrum, either at the UV edge or IR edge, but only slight visible absorption which is masked by the visible colorants (340). Although the hidden data is nominally visually imperceptible, an image capture device (250) having a visible spectral response from at least one spectrally distinct color imaging channel that extends into a spectral region just outside the visible spectrum where the spectral edge marker absorption occurs, can then detect the hidden data.

25 Claims, 21 Drawing Sheets

(56) References Cited

OTHER PUBLICATIONS

Park et al.; Invisible Marker Based Augmented Reality System, SPIE Proc., vol. 5960, 2005, pp. 501-508.

Yousaf et al.; Formulation of an Invisible Infrared Printing Ink, Dyes and Pigments, vol. 27, No. 4, 1995, pp. 297-303.
Hunt; The Reproduction of Colour, John Wiley & Sons Ltd., 2004.
Sharma; Digital Color Imaging Handbook, CRC Press, 2003.

* cited by examiner

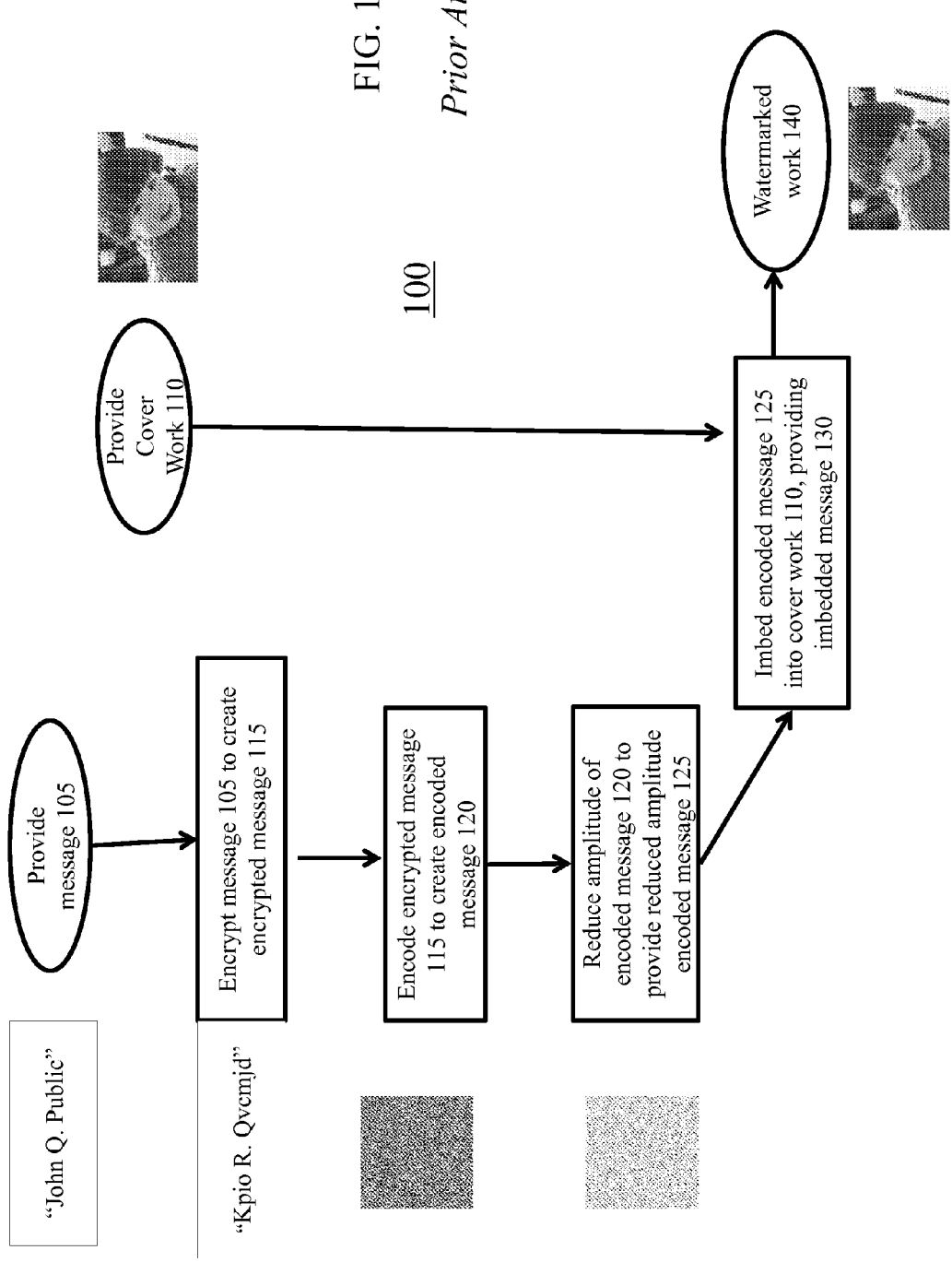

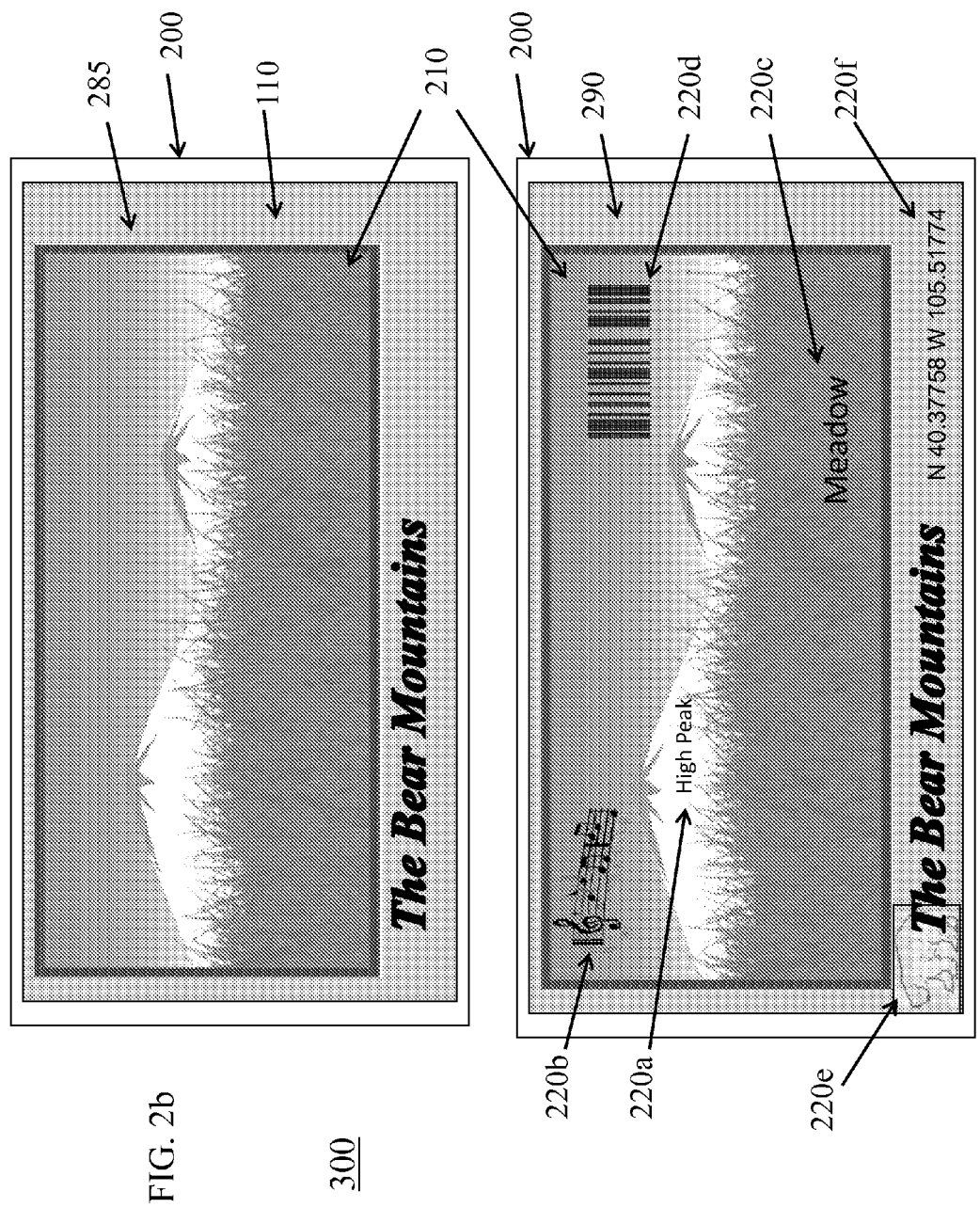

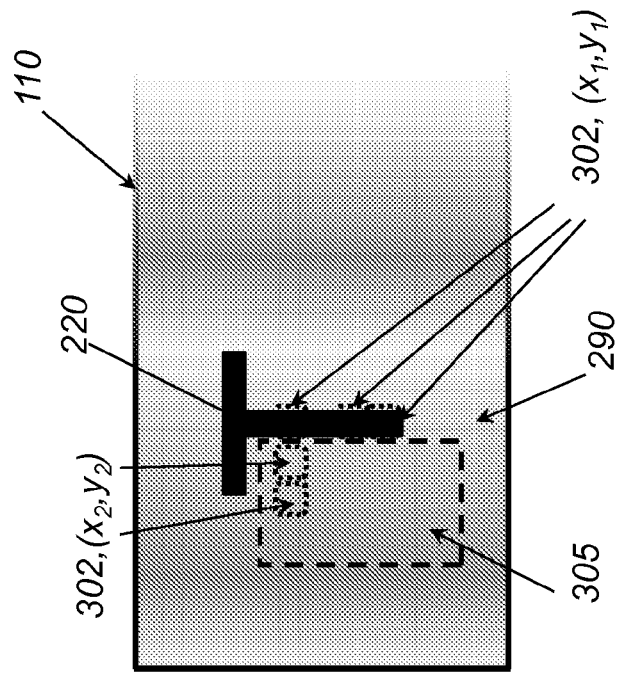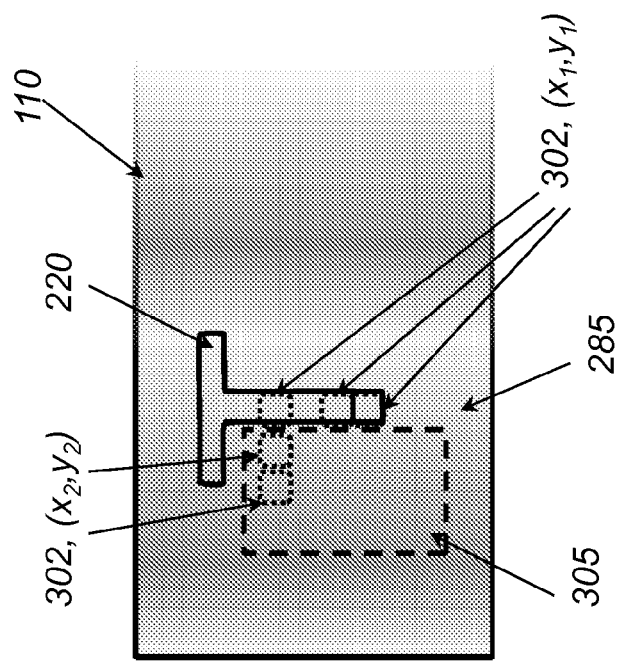
FIG. 2c

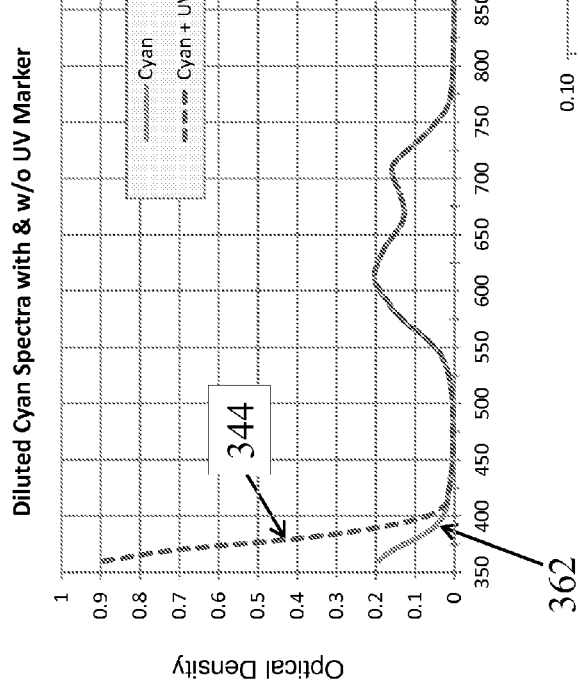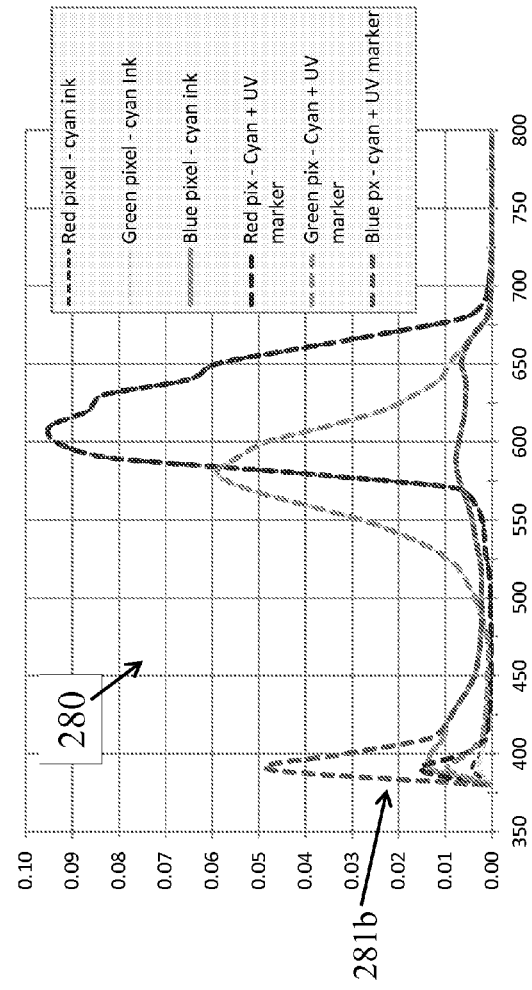
FIG. 8c
FIG. 8d

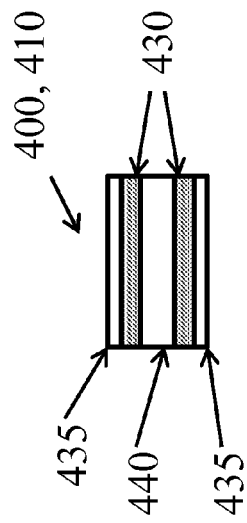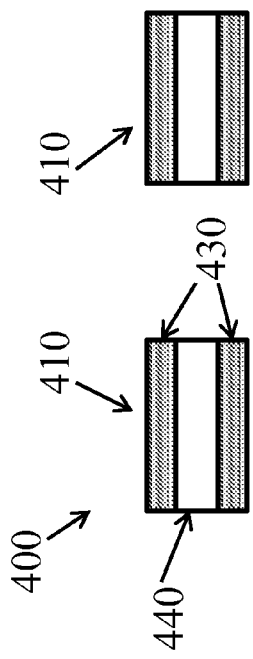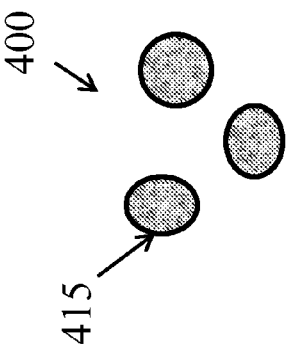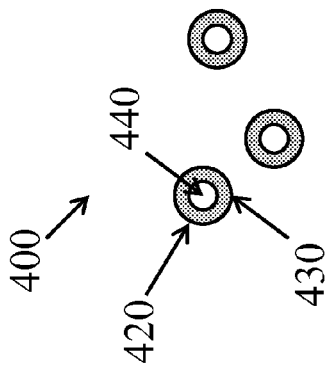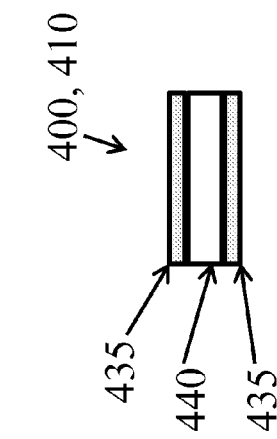

SPECTRAL EDGE MARKING FOR STEGANOGRAPHY OR WATERMARKING

CROSS REFERENCE TO RELATED APPLICATIONS

Reference is made to commonly-assigned U.S. patent application Ser. No. 13/526,820 (now U.S. Publication No. 2013/03357831), filed Jun. 19, 2012, entitled SPECTRAL EDGE MARKING FOR STEGANOGRAPHY OR WATERMARKING, by Kurtz et al.; and U.S. patent application Ser. No. 13/526,837 (now U.S. Publication No. 2013/0335784), filed Jun. 19, 2012, entitled SPECTRAL EDGE MARKING FOR STEGANOGRAPHY OR WATERMARKING, by Kurtz et al.; the disclosures of which are incorporated herein.

FIELD OF THE INVENTION

The present invention relates to data hiding, and particularly to data hiding, steganography, and digital watermarking of data in printed text or images using marking materials having an absorption spectrum at the edge of the human visible spectrum.

BACKGROUND OF THE INVENTION

As discussed in the book "*Digital Watermarking*", by I. Cox et al., Morgan Kaufmann Publishers, Inc., San Francisco, 2001, information hiding or data hiding is a broad term related to making information imperceptible (as in a watermark), or keeping the information and its existence secret. Steganography, which comes from the Greek words meaning "to cover tightly" and "writing", is the art and science of writing hidden or secret messages in such a way that no one, apart from the sender and intended recipient, suspects the existence of the message. For example, historical techniques to hide messages include the use of invisible inks or the writing of messages on envelopes in the area covered by postage stamps. As such, steganography is a form of security through obscurity. The presence of hidden data in a cover work maybe widely known, although not perceived, or the functional details can be known to just a few (people commonly know that currency has security features, although they know little of the specifics).

In the case of steganography, the hidden data is typically largely unrelated to the cover work in which it is hidden. By comparison, watermarking is the practice of altering a cover work to embed a message related to that work. The watermark can be a hidden message, such as embedded information in currency that aids authentication and thwarts counterfeiting. The watermark can also be obvious, such as data embedded in a cover work in a visually perceptible fashion. An example is a copyright protection message (e.g., text or logo) embedded in an image, with intent that the copyright holder gets attribution or payment for use of the image (cover work). In the modern world, steganography and watermarking are similar, and somewhat overlapping terms. Certainly, it is possible to embed both steganographic (unrelated) and watermark (related) hidden data in the same cover work.

Steganography and watermarking have both evolved technologically, including the emergence of digital steganography and digital watermarking. In digital steganography, data is concealed within a digital format, without causing noticeable changes to the file. Digital steganography is also related to hidden digital watermarking, although watermarking often uses smaller messages and has different purposes. In either case, a code that is imperceptible or nearly imperceptible to a human user can be embedded into media and detected by a machine vision system using an automated detection process. Typically, customized software is required to enable the practice of digital steganography or digital watermarking, in encoding, detecting, and decoding the hidden data.

It can be appreciated that there are many forms of cover work, including an image or text, a sound recording, an audio file, a document file, a video recording, or a software program. Although there are many known techniques for providing printed information with digital watermarks or steganographic data, opportunity remains for improved methods.

Printed digital watermarks, whether hidden or visible, are widely used to enable distinction of genuine items (e.g., media, currency, or artwork) from counterfeits and pirated copies. These authentication watermarks help combat losses of hundreds of billions of dollars in annual revenues that are stolen from industry by pirates (including counterfeiters). Alternate exemplary applications for hidden watermarks, whether embedded in an image or text, include providing a short sound track or an internet web address to an observer. Visible watermarks, such as those provided by commonly assigned U.S. Pat. No. 6,940,993 (Jones et al.), are often intended to be visually perceptible, although not visually objectionable, and can indicate the copyright owner of a given image. A QR code, which is a commonly used 2D bar code, can also be considered to be a form of a visible watermark.

The enablement of hidden digital watermarks is a trade-off of information capacity or density, image quality, and robustness. A digital watermark is considered fragile if it fails to be detectable after the slightest modification. Fragile watermarks are commonly used for tamper detection (integrity proof). Whereas, a digital watermark is semi-fragile if it is partially resistant to transformation, and a digital watermark is considered robust if it resists a designated class of transformations. Robust digital watermarks can be used for copy protection or to limit information access. Frequently, data for a given digital watermark is embedded in a multitude of images locations, to increase the likelihood that the hidden content can be reliably retrieved.

A variety of methods have been used to create hidden digital watermarks, including embedding hidden data within color images using frequency manipulation techniques that locally add a deliberate graininess to an image. Referring to FIG. 1, a typical prior art watermarking process 100 (or algorithm) is shown for embedding a message 105 into a digital image to create a watermarked work 140. In this case, the message 105 is the text "John Q. Public". Since the message 105 will eventually be converted to a binary representation for processing in a computing device, the message 105 can be anything that can be represented in a binary code. For example, the message 105 can be another image, a sequence of map coordinates, an internet address, etc. The cover work 110 is the digital image in which the message 105 will be embedded. The cover work 110 can be specific to an application or chosen at random, specifically to enhance some aspect of watermarking performance, or for any number of reasons unrelated to the watermarking application itself.

In many watermarking systems security is important, and an encryption algorithm creates an encrypted message 115 from the message 105 as a first step in the watermarking process 100. In FIG. 1, this is illustrated by a simple cipher in which each letter in the original message is substituted by the next letter in the alphabet. It should be obvious to a practitioner in the field that any cipher can be used as long as recipients decrypting the watermarked work 140 have knowledge of the cipher. After the message is encrypted, an encoding step follows to encode the encrypted pixel data to provide an encoded message 120. This encoded pixel data can be an image that is the same size as the cover work 110 or a smaller image (i.e. tile) that is some fraction of the size of the cover work 110.

The amplitude of the encoded message is then reduced to conform to the goals of the practitioner(s). The resulting reduced amplitude encoded message 125 is then added to the cover work 110 to produce a watermarked work 140 (a cover work 110 with embedded message 130). If the reduced amplitude encoded image 125 is a tile, the addition operation can involve adding the tile to the image at a multiplicity of non-overlapping locations in the cover work 110. In many watermarking systems, attributes of the cover work 110 are used in the encoding and amplitude reduction steps of the watermarking algorithm. The resulting watermarked work 140 can then be printed or displayed.

In a typical watermarking system, practitioners have a number of goals. Four important goals are: low visibility of the embedded message for individuals that are not intended recipients of the message; high perceived image quality of the cover work 110 once the message 105 has been transformed into an embedded message 130; robustness of that embedded message 130 to subsequent changes in the cover work 110 carrying with embedded message 130; and high information content of the embedded message 130. The importance of these goals to the practitioner in a particular watermarking algorithm affect the parameters used to control the encrypting, encoding, and amplitude reduction steps of the watermarking process 100. Often practitioners must trade off the goals of reduced detectability and high image quality against the competing goals of robustness of the embedded message and high information content in the embedded message. It is often desirable to reduce the amplitude of the encoded message 120 in order to make the watermark less detectable and to increase the perceived image quality of the cover work 110 with the embedded message 130.

For example, commonly-assigned U.S. Pat. No. 5,859,920 (Daly et al.) provides a watermarking approach where data is embedded in the source image data using a spatial frequency dispersal method. This process involves convolving the image data with an encoding carrier image to produce a frequency dispersed data image. As another example, U.S. Pat. No. 6,683,966 (Tian et al.), describes a watermarking method in which media signal is transformed from its perceptual domain to frequency domain regions and watermark data is embedded into one or more frequency domain regions. The image is restored to a perceptual space, in which it can be printed or displayed with the hidden data. Alternately, U.S. Pat. No. 6,522,767 (Moskowitz) provides optimization methods for the insertion, protection, and detection of digital watermarks in digitized data. In particular, the quality of the underlying content signals can be used to identify and highlight advantageous locations for the insertion of digital watermarks. The watermark is integrated as closely as possible to the content signal, at a maximum level to force degradation of the content signal when attempts are made to remove the watermarks. For example, this can mean locating intensity changes that represent the watermark, and which can appear as noise to a human viewer, in image locations that have variable content instead of locations that have uniform or nearly uniform content.

As another example, where color coding is used instead of frequency coding, U.S. Pat. No. 8,064,100 (Braun et al.) provides a method for hiding a watermark in a color image using colorants that have essentially the same visual color as other colorants, but which have different spectral profiles in the visible spectrum. The difference between these metameric pair colorant sets can be revealed by illuminating the color image with narrow bandwidth visible light sources such as light emitting diodes (LEDs).

A problem with embedding watermarks in images to be sufficiently imperceptible to human viewers, such that they are reliably hidden, is that the information capacity and density are often quite limited. For example, a typical digital watermark has a constrained data capacity of only 32 bits, which is generally insufficient to directly store a website link. Instead, such a watermark can provide a smaller data code that can be translated at a database, such as at the Discover Online Services Portal™, provided by Digimarc (Beaverton, Oreg.). By comparison, the highly visible QR codes can store between 100 bits to 20 kbits of data, depending on the visible area occupied by the code.

Alternately, digital watermarks or covert data can be provided by printing invisible or nearly invisible features. For example, AlpVision (Vevey, SW) offers a solution called Cryptoglyph™, in which micro-dots are printed with standard inks with the dot size and dot color manipulate to make them virtually invisible. For example, a small yellow dot can be hard to perceive on white paper, being visually lost within the imperfections of the paper, and yet also be detected by a flat-bed document scanner. While this solution does not require special inks, the hidden data density is low and the data cannot be embedded in busy images.

Digital data can also be hidden using "invisible" inks, using materials with at least an absorbance outside the visible band. However, such inks typically have visible color crosstalk and can only be used under limited conditions. For example, the paper "*Invisible Marker Based Augmented Reality System*", by H. Park and JA. Park, published in the SPIE Proc., Vol. 5960 (2005), used an infrared (IR) ink that absorbs 793 nm IR light and fluorescently emits at 840 nm IR light. However, as the ink had a faint green appearance, ink density needs to be low to retain invisibility. Additionally, both a specialized light source and imaging device are required. As another example, the paper "*Formulation of an Invisible Infrared Printing Ink*", by M. Yousaf & M. Lazzouni, published in Dyes and Pigments, Vol. 27, pp. 297-303 (1995), discusses the use of a silicon naphthalocyanine based IR absorbing ink, which provides small light absorption change ($\Delta R \sim 15\%$) at 790 nm, that can be detected using an illumination source emitting at 790 nm. This small IR absorption is limited in part by visible crosstalk, as the dye is not truly invisible, but has a green tint. Additionally, crosstalk of visible dye absorption into the IR spectrum could easily mask or confuse this weak IR absorption signal. Increasing the IR absorption density to improve signal detection or bit depth is limited in part because the crosstalk visible absorption increases as well. Yousaf et al. suggests that the green tint can be overcome by printing the "invisible" infrared printing ink on a uniform green tinted print media.

It is also noted that IR dyes or pigments are particularly unstable, typically when used in low concentrations, and vulnerable to environmental degradation, including high humidity or dye fade with UV or visible light exposure. Commonly-assigned U.S. Pat. No. 6,706,460 (Williams et al.) describes an ameliorative process that involves loading IR dye in a latex particle.

Invisible ultraviolet inks have also been used for stegonagraphy and watermarking. In particular, inks in which incident ultraviolet light (UV) stimulates visible fluorescence can be particularly useful. For example, U.S. Pat. No. 5,542,971 (Auslander et al.) describes an ultraviolet ink composition that provides visible fluorescence in response to UV exposure that can be used to print bar code information. Typically, such inks are revealed by illumination from specialized light sources such as black lights or UV LEDs that provide UVA (315-400 nm) or UVB (280-315 nm) light. However, as atmospheric filtered solar UV light extends down to 280 nm, there is a risk for accidental activation and content disclosure. As the solar intensity in the UVB range is comparatively low, the risk of accidental disclosure is reduced for materials with lower activation wavelengths.

Of course fluorescent materials that both absorb and emit not visible light, whether UV or IR (see U.S. Pat. No. 6,149, 719 (Houle) for example), can used to reduce visible spectrum visibility, but then both a special illuminant and imaging device are required. As another approach to compensating for the visible fluorescence of UV stimulable materials, U.S. Pat. No. 6,718,046 (Reed et al.) provides a low visibility watermark using time decay fluorescence. In particular, this fragile digital watermark can be printed with two UV inks having visible fluorescence with different (short and long) decay times. When stimulated with a UV pulse, the digital watermark is detected after the first emission decay time, but before the second emission decay time. However, when illuminated by a constant or steady-state UV illumination, such as atmospheric filtered solar UV light, both materials fluoresce, obscuring the watermark. Although such approaches can be desirable for very covert applications, they are less desirable for consumer applications.

In summary, opportunity remains to provide improved solutions for steganography or watermarking that enable the embedding of comparatively large amounts of hidden data in images, while causing minimal perceptible degradation in image quality for human observers. Additionally, embedded watermarks of this type, whether digital or analog, that can be easily detected and interpreted by consumer devices, would have significant value.

SUMMARY OF THE INVENTION

Briefly, according to one aspect of the present invention a system for detecting visibly hidden content on a print media includes a print media printed with image content comprising one or more normal printing process colorants. At least one spectral edge marker material is printed onto at least one image region of the print media to provide visually hidden data, wherein the spectral edge marker material has a substantial spectral absorption just outside the human visible spectrum. An image capture device has a visible spectral response which includes both red, green, and blue spectrally distinct imaging channels and an overall spectral response including a spectral region just outside the visible spectrum. At least one normal printing process colorant is printed on the print media in regions that are both overlapping with and adjacent to the image regions having the at least one selectively printed spectral edge marker material, such that image regions having only the at least one normal process colorant and the image regions having the at least one selectively printed spectral edge marker material and the at least one normal printing process colorant are color matched. The image capture device detects the at least one spectral edge marker material ink using at least one spectrally distinct color imaging channel having a spectral response inclusive of at least a portion of the spectral absorption of the at least one spectral edge marker material.

The invention and its objects and advantages will become more apparent in the detailed description of the preferred embodiment presented below.

BRIEF DESCRIPTION OF THE DRAWINGS

FIG. 1 depicts a prior art digital watermarking process.

FIG. 2b depicts an image having exemplary first and second appearance states involving printed content using the method of the present invention.

FIG. 2c depicts exemplary spectral edge marker printed matter having image pixels or pixel positions with first and second appearance states.

FIG. 8a and FIG. 8c each depict modeling of a UV spectral edge marker in combination with a commercially available inkjet ink.

FIG. 8b and FIG. 8d each depict sensor response to the combinations of spectral edge marker and commercially available inkjet ink for FIG. 8a and FIG. 8c respectively.

FIGS. 10a-10e each depict exemplary encapsulated ink particle structures.

DETAILED DESCRIPTION OF THE INVENTION

Figure 2A:
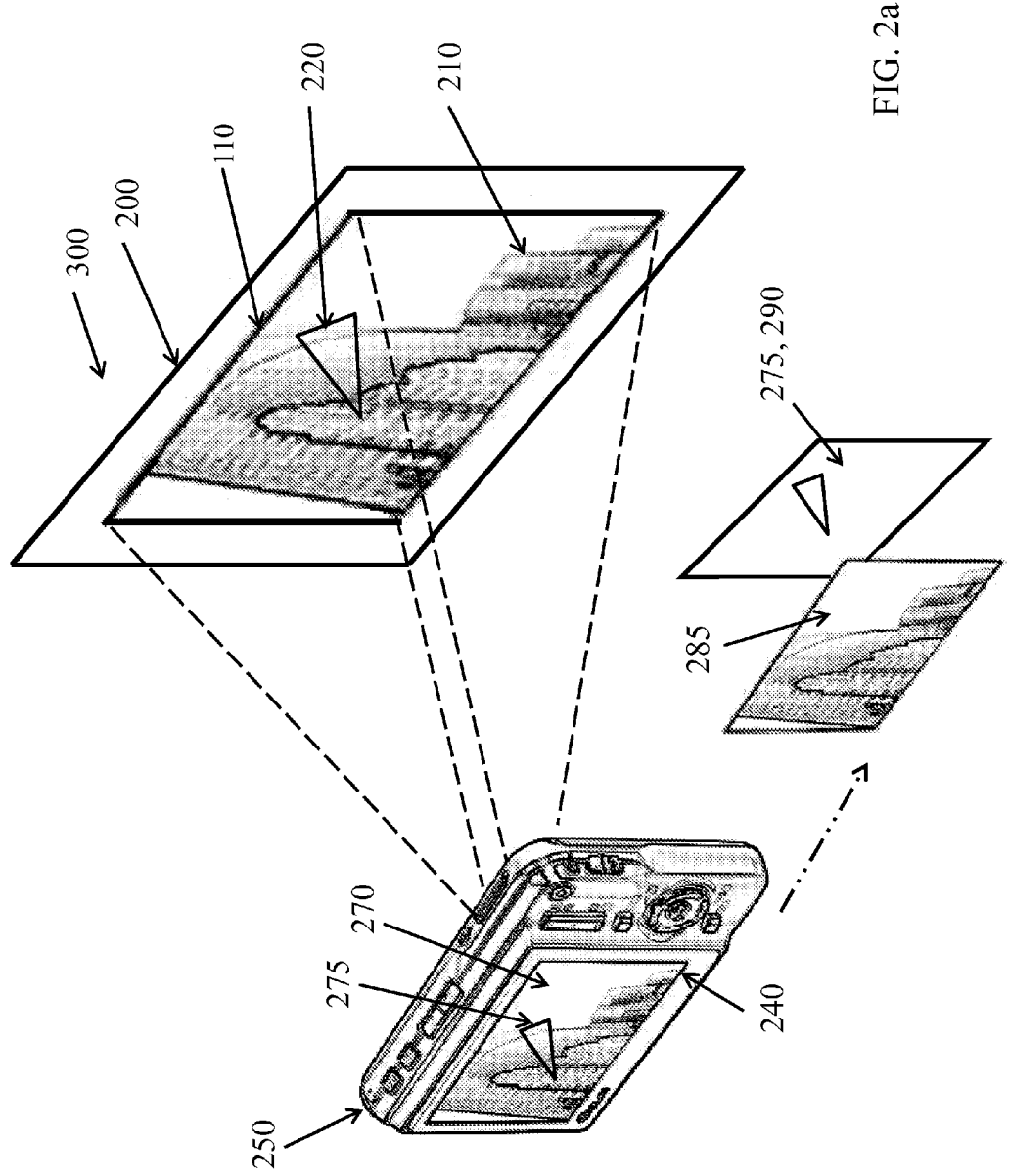
FIG. 2a depicts an exemplary image capture scenario involving printed content using the method of the present invention.

The present invention will be directed in particular to elements forming part of, or in cooperation more directly with the method and apparatus in accordance with the present invention. It is to be understood that elements not specifically shown or described may take various forms well known to those skilled in the art.

The primary goal of the present invention is to provide an improved method for data hiding, whether for steganography or watermarking, and particularly for digital steganography or digital watermarking, that enables comparatively large amounts of data to be embedded in printed matter, and particularly images, and retrieved there from, without this data being generally perceptible to one or more human viewers. Depending on the embodiment of the present invention, and the attributes of the cover work 110, exemplary data stored therein could include Internet Protocol version 6 (IPv6) website addresses (128 bits), a human readable or textual website address (often >500 bits), text (a page of text ~3 KB), an image, a sound track (10 seconds of sound ~80 KB), machine readable code (e.g. a QR code), or combinations thereof. For the primary applications of providing consumer accessible data, it is desirable that the data can be detected and accessed by a common consumer device, such as a cell phone. This image capture device can be a digital camera, a web camera, a tablet computer device, a cell phone camera, or other comparable device.

In particular, the present invention provides for the use of marker ink(s) that are invisible to the eye, but are detectable by an image capture device using normal color filtering. Certainly, invisible inks are known in the art, if not the imagination. In many cases, invisible inks remain invisible until they are activated by an external stimulus, whether heat, light (UV stimulated fluorescence) or chemistry. However, for example, for security purposes, advertising, informational or entertainment purposes, it can be useful to have an invisible ink in which a residual color component can be successfully managed. When this ink or marker is selectively printed in the content of a cover work 110 that also has normal process inks, hidden data 220 is provided, which can be then be detected with proper detection methods.

Accordingly, FIG. 2a depicts a general use case for the present invention. As shown, spectral edge marker printed matter 300 of the present invention, exemplified by a print media 200 containing a cover work 110 having an image 210, also has hidden data 220, where the hidden data 220 is not perceived by one or more human viewers (not shown). A human observer can use image capture device 250 to acquire a digital picture (still or video) of a portion of print media 200 containing the image 210 with the hidden data 220. In this example, a resulting captured image 270 is displayed on the electronic display 240. Depending on the data processing provided within the image capture device 250, or accessed by image capture device 250, the hidden data 220 can be displayed as a digital image of hidden data 275 on the electronic display 240 or not. In FIG. 2a, the hidden data 220 is shown as an exemplary pictorial shape or image (e.g., a triangle). Additionally, an icon or alert can be provided on the electronic display 240 to offer the user the opportunity to access the hidden data 220, which could be text or an image. As an application example, the hidden data 220 can be a digital watermark such as a website address, which can then be accessed, either automatically or by user selection. Alternately, the hidden data 220 can be a sound track, such as speech, animal or machine sounds, or music, which can then be played by the image capture device 250 or another connected device. While image capture device 250 is shown as a camera, it should be understood that the image capture device 250 can be another type of device, such as a document scanner.

As further shown in FIG. 2b, the spectral edge marker printed matter 300 of the present invention is a print media 200 with at least one cover work 110 (including image 210) which has both a first appearance state 285 in which the hidden data 220 is not visible to human perception and a second appearance state 290 in which the hidden data 220 is detected by an image capture device 250. Within the second appearance state 290 of the image depicted in FIG. 2b, which is a nature scene illustration of snowy mountains protruding into the blue sky, with green grass in the foreground, exemplary hidden data 220a is shown in the off white snowy portion. Other hidden patterns, 220b and 220d are provided in the blue sky image portion, and 220c in the grass image portion. As suggested by the exemplary second appearance state 290, for the present invention, hidden content (220a-220d) can be provided in different image areas having different image colors and image densities. As shown by hidden data 220e and 220f, hidden data can also be provided and detected in areas of the cover work 110 with colored fields or grey fields or text content. As examples, hidden data 220 can include text (220a, 220c), sound tracks (musical notes 220b), machine readable codes (220d, e.g., a bar code), images (220e), text (220f, GPS coordinate).

FIG. 2c provides further clarity on this idea. Exemplary spectral edge marker printed matter 300 is a simplified cover work 110 having a gradient fill that has a first appearance state 285 where the hidden data 220 is nominally not visible to a human observer, although exemplary hidden data 220 (an outline of the letter "T") is shown in outline form for clarity. In this first appearance state 285, pixels 302 at positions $(x_1,y_1)$ within the hidden data 220 depict the cover work 110 and are color matched to their nominal pixel coloration for those locations of the cover work 110, to within some tolerance. The color match can also relate to pixels 302 at positions $(x_2,y_2)$ within adjacent image areas 305 having relevant image content. In a second appearance state 290, image processing of a captured image 270 acquired by an image capture device 250 has revealed hidden data 220 (the letter "T", depicted darker) printed with spectral edge markers 320 of the present invention. As suggested by FIG. 2a, image capture device 250 can provide output that corresponds to the first appearance state 285 (the original image), the second appearance state 290 (the hidden data 220), or the combination thereof. This output can be digital images, including a digital image of hidden data 275 that depicts the hidden data 220 corresponding to the second appearance state 290.

Figure 3A:
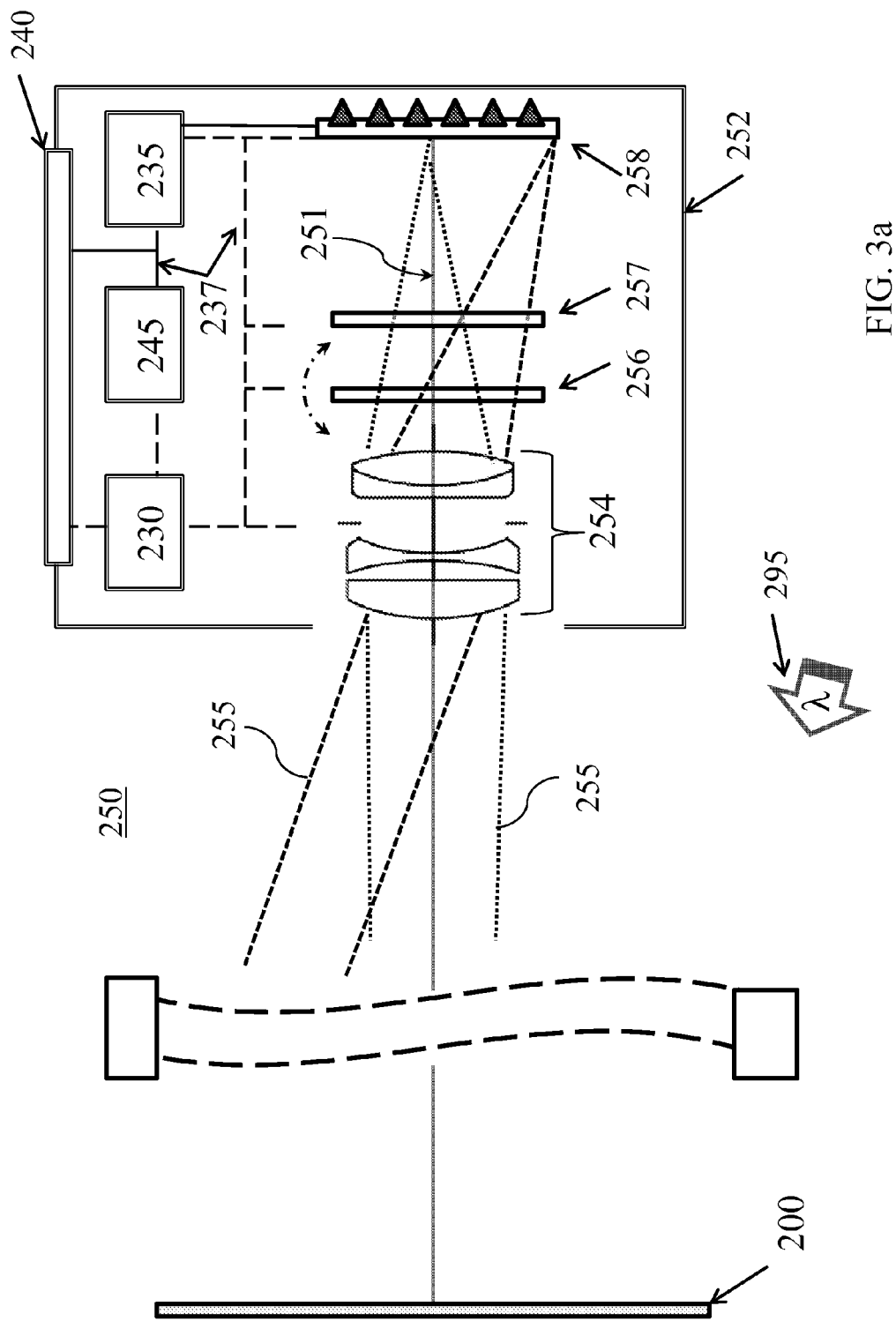
FIG. 3a depicts greater detail related to an image capture device being used to acquire images of a print media having hidden content printed using the method of the present invention.

FIG. 3a depicts key components of an exemplary system for detecting hidden data 220 that is embedded in a cover work 110 using spectral edge markers 320. This system features an image capture device 250 which is a camera, including lens 254, infrared (IR) filter 256, and image sensor 258, all of which reside within a housing 252, which can be used to reveal hidden data 220 according to the method of the present invention. Image capture device 250 can be directed towards a distant printed media 200 having hidden data 220 to capture image light 255 and thus acquire at least a digital image of hidden data 275 in accordance with the optical properties of the image capture device 250, the light source or illuminant 295, and the printed media 200. The optical properties of the image capture device 250 are determined by at least the lens 254, IR filter 256, and image sensor 258, while the optical properties of the print media depend at least on the physical properties of the print media itself (e.g. surface roughness, whiteness), the hidden data markers, and the colorants printed thereon. Image capture device 250 can have a controller 230 which can provide operational signals via interconnects 237 to an image processor 245, a memory 235, the image sensor 258, the electronic display 240, an iris at the lens aperture, and potentially for the optical filters (256, 257). Illuminant 295 is generally assumed to provide visible light, overlapping or further including light at the UV-Blue spectral edge (~370-420 nm), or the Red-IR spectral edge (660-720 nm), or both. Such ambient light can be ambient daylight illumination, or light from a constructed light source, such as for example, an incandescent light, light from white light emitting diodes (LEDs), or a D65 or D50 equivalent light source.

Most commonly, the image sensor 258 is charge coupled device (CCD) or a complementary metal-oxide-semiconductor (CMOS) device having a structure with an addressed array of image pixels. Image data is directed via interconnects 237 to memory 235, and then prepared by image processor 245 for network transmission or viewing via electronic display 240. As silicon-based image sensors 258 typically have a spectral response spanning from the ultraviolet (UV) to the IR (300-1100 nm), color filtering is typically provided to restrict incoming light to the visible band 310 (≈400-700 nm), and more particularly to each color band (blue 400-490 nm, green 490-580 nm, and red 580-700 nm, for example). Although the exemplary image capture device 250 shown in FIG. 3*a* has a single image sensor 258, it should be understood that a three sensor approach can be used, where incident light is split (usually by a beam splitter) into separate red, green, and blue (RGB) color channels, where light of a given spectrum is directed to a dedicated image sensor 258. For the approaches with a single image sensor 258, a color filter array (CFA) can be overlaid and aligned to the image sensor 258, to provide color specific pixels. This color filter array (not shown) can have a Bayer RGBG color filter pattern, with a 50% green, 25% red and 25% blue mosaic of color patches. Other filter patterns, such as RGBW, where W is white, can be used. The image sensor 258 can also be of the type of the Foveon X3 sensor (Foveon, Santa Clara, Calif.), where at each pixel location, the wavelength-dependent absorption of light within the silicon provides the color filtering with a depth dependent readout of signals.

Figure 3C:
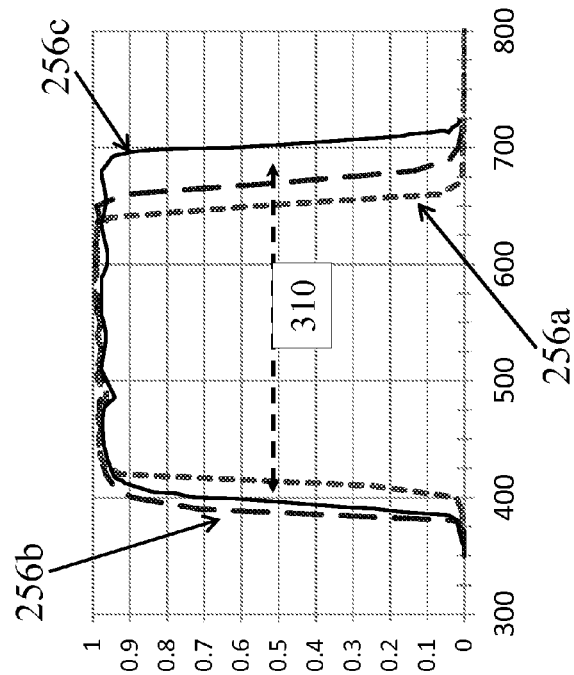
FIG. 3c depicts typical spectral profiles for IR cut filters.
Figure 3B:
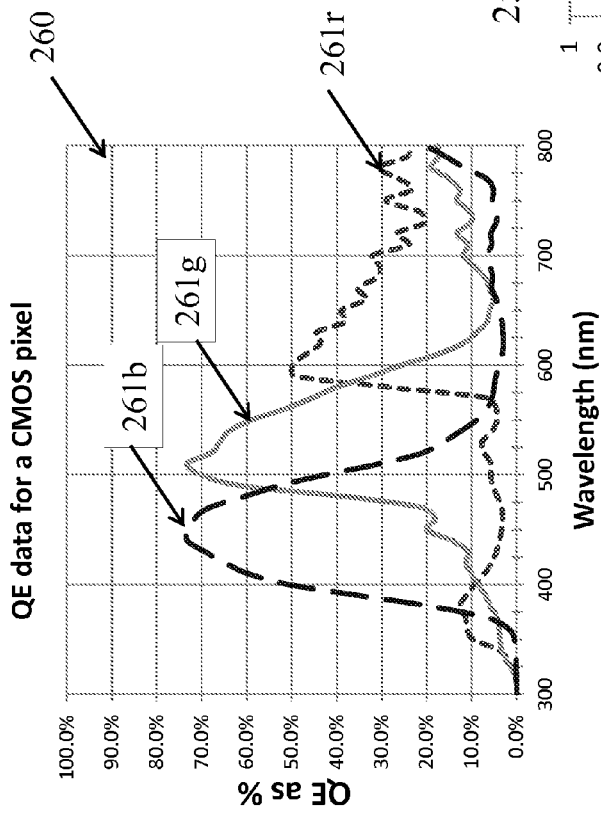
FIG. 3b depicts a typical spectral response for an RGB filtered pixels of a CMOS image sensor.

As a specific example, FIG. 3*b* depicts the spectral response, as quantum efficiency (QE), of an image sensor 258 that is a typical CMOS device, which combines both the silicon and CFA spectra into three curves, one per pixel type (RGB). For example, the native camera spectral response 260 comprises blue pixels response 261*b*, green pixels response 261*g*, and red pixels response 261*r*. While sensors for high end image capture devices 250 can have dichroic based color filter arrays with sharp spectral cut-offs, for lower cost image capture devices 250, the CFAs are typically fabricated with dyes or pigments. These colorants typically have rounded spectral profiles and crosstalk into other color spectra. FIG. 3*b* also shows that UV light (<400 nm) and IR light (>700 nm) can pass through the CFA color filters, and reach the pixels, to cause spurious color readings. To correct for this, image capture devices 250 usually also include an IR filter 256. Accordingly, FIG. 3*c* depicts the spectral transmission of three exemplary IR cut filters which can be used with CCD or CMOS type image sensors 258 in image capture devices 250 such as consumer digital cameras. IR cut filter spectral profiles are shown for three representative dichroic type IR filters 256. These profiles both provide high transmission over most of the visible spectrum, and abrupt drops in transmission, to reflect both UV and IR light so that little of such light will reach the image sensor 258. To enable trade-offs of light sensitivity (or color signal) versus lack of out of visible band crosstalk, IR filters 256 with narrower or wider visible spectral transmission bands can be used, as exemplified by the narrow (IR filter 256*a*) and wide (IR filter 256*c*) curves. Exemplary IR filter 256*a* and IR filter 256*b* are used in some commercially available models of cell phone cameras. IR filter 256*b* is an intermediate example relative to the other two, and is spectrally wider and UV shifted relative to filter 256*a*, having a 50% transmission point at ~390 nm for the UV-blue spectral edge 262, and a 50% transmission point at ~660 nm for the red-IR spectral edge 264. IR filter 256*c* represents the case where the red-IR spectral edge 264 cuts at higher wavelengths (50% transmission point at ~680-720 nm). It should be understood that separate dedicated filters, a UV-blue edge filter and a red-IR edge filter, can be used instead of a single filter (the IR filter 256) that defines both spectral edges; the former having better spectral control, and the latter a reduced cost.

Figure 3D:
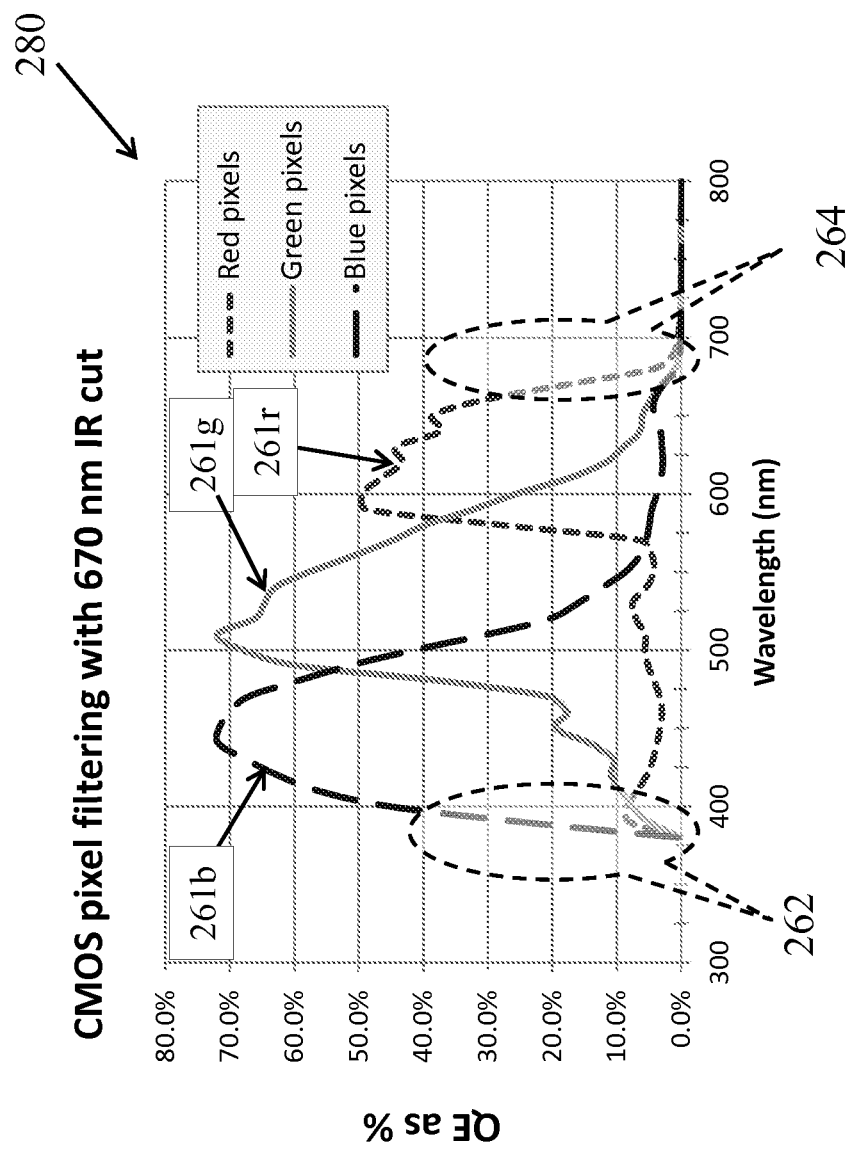
FIG. 3d depicts a combined spectral response for an exemplary CMOS image sensor including an IR cut filter spectral response.

In combination, the silicon and CFA spectral response of FIG. 3*b*, and the spectral transmission of IR filter 256 of FIG. 3*c*, give an overall image capture device spectral response 280, as shown in FIG. 3*d*, comprising blue pixels response 261*b*, green pixels response 261*g*, and red pixels response 261*r*, modified by the presence of the IR filter 256. This depicted image capture device spectral response 280 was calculated using the intermediate IR filter 256*b* of FIG. 3*c*. As that IR filter 256 has a 50% transmission point at ~390 nm for the UV-blue spectral edge 262, this combination of image sensor 258 (with RGB color filtering) and IR filter 256 provide spectral sensitivity at or below 400 nm, particularly for the blue pixels, but also for the red and green pixels.

Accordingly, when the image capture device 250 is used, the resulting imaged color camera response 280 can be altered by acquiring captured images 270 of a cover work 110 having hidden data 220. The imaged color camera response 280 is processed by the sensor electronics to provide integrated red, green, and blue pixel signals (281*r*, 281*g*, and 281*b*). Subsequent image processing (245) of these pixel signals can provide marker signals (350) that reveal hidden data 220. In particular, when light from illuminant 295 falls on the print media 200 bearing the cover work 110 and hidden data 220, reflected light can then be captured and imaged by the image capture device 250, resulting in a captured image 270. The largest signal will occur where the print density is lightest or base white print media 200 is exposed to the incident light. The lowest signals will occur where the print density is highest and the least amount of reflected light is available for imaging by image capture device 250. The difference represents a dynamic range or imaged signal. In subsequent diagrams (e.g., FIGS. 6*b*, 6*c* and FIGS. 8*b*, 8*d*) where exemplary imaged color camera responses 280 are plotted, these graphs present image signals or densities, and are essentially inverted from incident light intensities.

Figure 4:
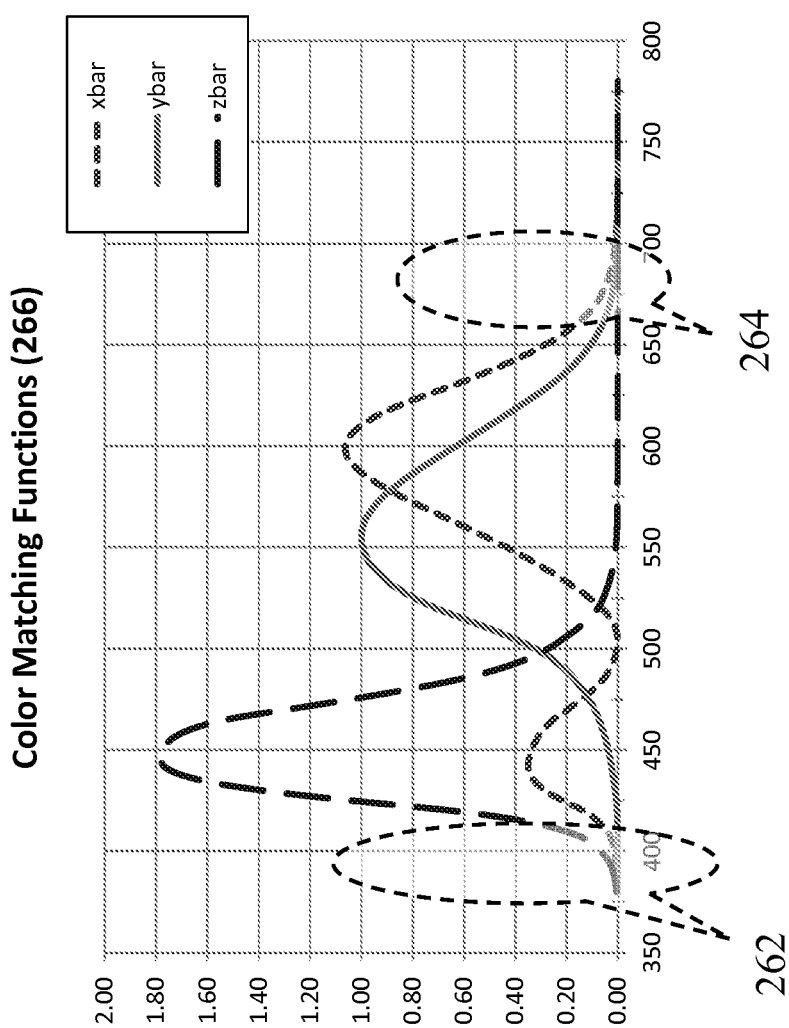
FIG. 4 depicts the 1931 CIE human color matching functions.

Comparison is now made to the overall image capture device spectral response 280 depicted in FIG. 3*d* and the CIE 1931 color matching functions 266 shown in FIG. 4. The CIE 1931 color matching functions 266, x-bar, y-bar, and z-bar respectively, are similar to the red, green, and blue pixel responses that comprise the image capture device spectral response 280 in having rounded spectral profiles and color crosstalk in other color channels. For the purposes of the present invention, particular attention is directed to the UV-blue spectral edge 262 and the red-IR spectral edge 264. In both cases, spectral response is dropping rapidly, as the human eye lacks significant sensitivity to either UV or IR light, and the color and UV and IR filtering for the image sensor 258 has been generally tailored to have the same traits. However, the two sets of curves are not identical, and importantly the image capture device 250, via the spectrally filtered image sensor 258, can have residual spectral sensitivity at the UV-blue spectral edge 262, the red-IR spectral edge 264, or both that the human eye lacks.

In particular, opportunity exists to provide hidden data 220 for watermarking or steganography at one or both of these spectral edges which can be detected by an image capture device 250, but which is generally not perceived by human observers. Accordingly, the present invention provides that areas or regions of the print media can be selectively printed with invisible or nearly invisible marker materials that fall within at least one of these spectral edge (SE) bands (262 or 264) to provide hidden data 220. In particular, as suggested by FIG. 5, if a spectral edge marker 320 has significant absorption at the UV-blue spectral edge 262, or the red-IR spectral edge 264, or both, but is highly transmitting (ideally >99%) or has a low broad visible marker absorption 337 across most of the visible band 310, then the potential exists to provide hidden data 220. For example, if hidden data 220 is printed with an spectral edge marker 320 at the UV-blue spectral edge 262, and particularly provides print density between 380-400 nm, then the blue pixels response 261b of the exemplary image capture device spectral response 280 of FIG. 3d can detect more image density in image areas where the spectral edge marker 320 is printed, as compared to neighboring image areas where the spectral edge marker 320 is not printed (see FIG. 2c). This can occur by a process that will be described subsequently in greater detail, but which is summarized as follows: when an image is captured with a UV spectral edge marker (325), the blue pixels response 261b is modified by print density changes, yielding blue pixel signals 281b. Image processing of the blue pixel signals 281b by a processor 245, yields signals and signal differences indicative of the image density that can reveal hidden data 220, including text, numbers, or images.

Figure 5:
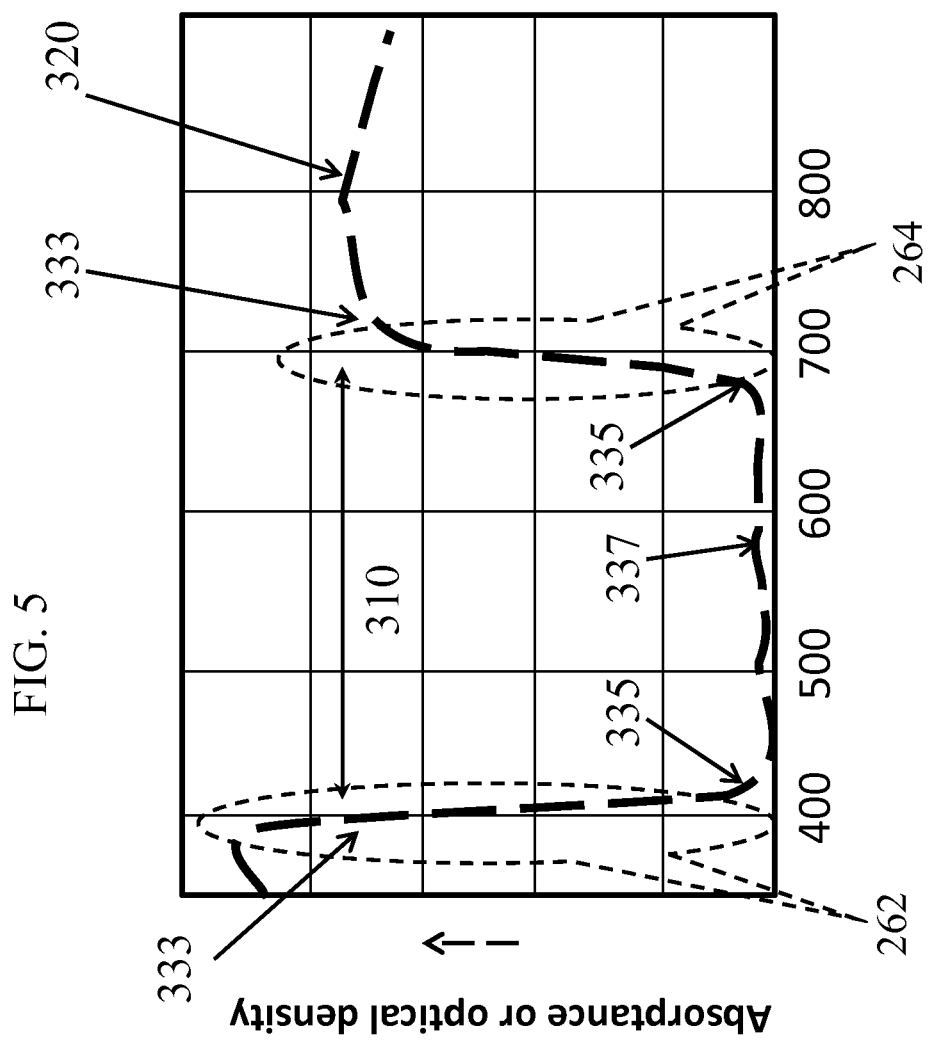
FIG. 5 depicts exemplary attributes of spectral edge markers used within the method of the present invention.

A generally equivalent result can be attained if the spectral edge marker 320 of FIG. 5 provides significant absorption the red-IR spectral edge 264, with the signals revealing the hidden data 220 taken from the red pixel data. In another case, the spectral edge marker 320 provides significant absorption at both the UV-blue spectral edge 262 and the red-IR spectral edge 264, and detection of hidden data 220 by the image capture device 250 can be made more robust, as both red and blue pixel output signals can be used, and even correlated, to detect and identify the hidden data 220. The exemplary spectral edge marker 320 in FIG. 5 can be a single chemical composition that provides both absorption attributes, or a mixture of at least two compositions [$m_1, m_2, m_3, \ldots$] to provide a single spectral edge profile or the dual spectral edge absorption profiles.

In considering the exemplary spectral absorption profile of FIG. 5, it is noted that there are issues in providing light absorption at the UV-blue spectral edge 262 or the red-IR spectral edge 264. To begin with, in using spectral edge absorption, it is noted that the spectral bandwidths at the UV-blue spectral edge 262 and the red-IR spectral edge 264 can be quite narrow (~20-50 nm), where for purposes of the present invention, the UV-blue spectral edge 262 can comprise $\Delta\lambda$~370-420 nm and the Red-IR spectral edge 264 can comprise $\Delta\lambda$~670-725 nm. Providing useful optical density for the spectral edge marker 320 within at least one of these spectral bands, without providing visible crosstalk can be quite difficult. With respect to the UV absorbers, the UV to blue edge is typically spectrally abrupt. However, as exemplified by the previously discussed U.S. Pat. No. 5,542,971 (Auslander et al.) most UV absorbers provide visible fluorescence when stimulated by UV light. As this visible fluorescence can readily occur and be seen by human observers, use of such materials generally defeats the purposes of the present invention. By comparison, for the IR absorbers, the drop in spectral absorption on the short wavelength (red) side is typically not spectrally abrupt. For example, copper phthalocyanine has an IR absorption peak at 800 nm, but a low wavelength shoulder of light absorption in the high red/low IR (670-750 nm), and a lower wavelength (620-670 nm) tail of absorption. In the case of the non-fluorescing absorbers, increasing density for the marker signal absorption 333 of the spectral edge marker 320 to improve signal to noise or increase bit depth can also increase the color crosstalk (at least the marker toe absorption 335) into the visible spectrum. However, in considering the color matching functions 266 of FIG. 4, perceptual response at the band pass edges is greatly reduced compared to the spectral sensitivity peaks, and increases in marker toe absorption 335 can potentially be barely perceptible and tolerable. However, typical "invisible" inks, such as the previously discussed copper phthalocyanine or the IR ink of Yousaf et al., have a residual color appearance (e.g. a faint green coloration) from both marker toe absorption 335 and the broad visible marker absorption 337 in the visible band 310. As the invisible marker density increases to provide a better signal for the hidden content, the color crosstalk increases, defeating the purpose. Yousaf et al. suggests that the green tint can be overcome by printing the invisible infrared printing ink on a flat field green tinted print media. However, it is desirable to embed hidden data 220 in variable image data, rather than be limited to low density uniform color fields.

As further background to understanding the use of spectral edge markers 320, it is noted that the propagation of light can be described by wave equations, including Eq. (3) which describes a plane polarized wave $\psi(x,t)$ as a function of the distance x and the time t, where $A(x,t)$ is the amplitude function, and $\phi(x,t)$ is the phase of the disturbance:

$$\Psi(x,t)=A(x,t)e^{i\phi(x,t)} \quad (1)$$

The amplitude function $A(x,t)$ can be expanded to show its dependence on light absorption $\alpha$:

$$A(x,t)=A(x)=A_0 e^{-\alpha x/2} \quad (2)$$

where $A_0$ is the initial amplitude, and the absorption coefficient $\alpha$ has units of inverse distance, such as mm$^{-1}$. This leads to Beer's Law that describes the exponential nature of light absorption:

$$I(x)=I_0 e^{-\alpha x} \quad (3)$$

where $I(x)$ is the light intensity (or irradiance) in units of W/m$^2$, and $I_0$ is the initial light intensity. Thus, the transmittance $t=I(x)/Io=e^{-\alpha x}$.

The light absorption impact of the spectral edge markers 320 (e.g., FIG. 5) can then be plotted using absorptance ($A=1-t$) or the optical density $D=\log_{10}(1/t)$. For the purposes of the present invention, it is desirable that the spectral edge markers 320 provide a substantial spectral absorption just outside the human visible spectrum, by for example, providing an optical density (or absorbance) $D_{SE}\geq 0.3$, and preferably $D_{SE}\geq 0.5$. Moreover, if for example, $D_{SE}\geq 1.0$, then dynamic range, signal to noise ratio, bit depth, and data capacity can all be significantly increased. It is noted that optimally, optical density benchmarks or thresholds would be based on spectrally integrated densities over the spectral width matching an illuminant would give a good measure. However, as that can be difficult to assess quickly, peak densities and average density differences can be used instead.

Figure 6A:
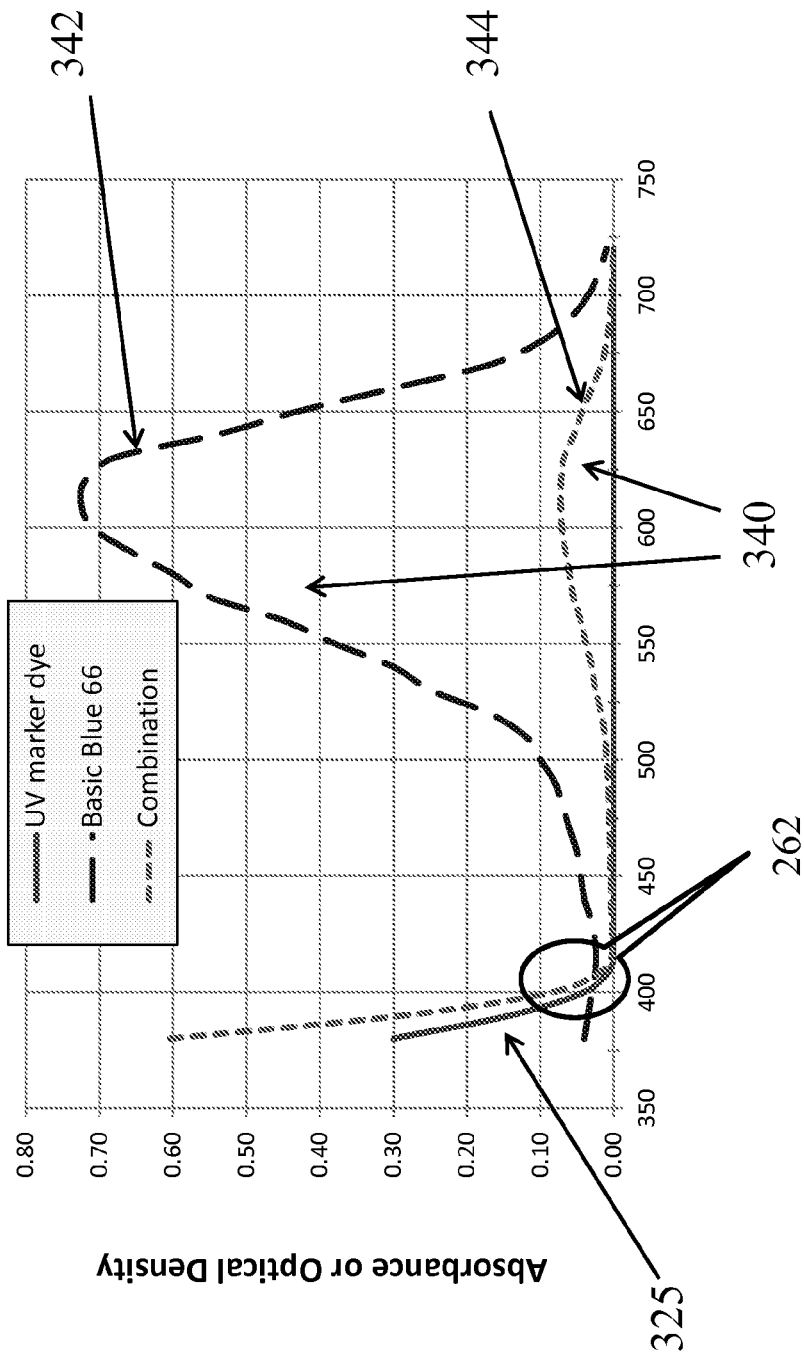
FIG. 6a depicts the absorption spectra for a UV spectral edge marker and an exemplary visible colorant, Basic Blue 66.

As UV absorbers are more likely than IR absorbers to provide an abrupt edge change in light absorption into the visible spectrum, attention is first directed to selection and uses of non-fluorescing 370-415 nm high UV absorbers. FIG. 6a depicts the modeled results for combined printing of a spectral edge marker 320 that is a representative UV edge marker 325, paired with a visible colorant 340. Visible colorants (VC) 340 are intended to provide a significant visible absorption, and preferably significantly less light absorption in the spectral region (262, 264) of the spectral edge marker 320. This difference in visible absorptions can be quantified by a color matching perceptual difference ΔE* or a density difference $\Delta D = \Delta D_2 = D_{VC(VIS)} - D_{SE(vis)}$.

Non-limiting examples of UV absorber materials useful as the non-fluorescing UV edge marker 325 can be selected from hydroxybenzophenones, hydroxyphenyltriazines, hydroxyphenylbenzotriazoles, dibenzoylmethanes, and the like. The UV absorbers may be used alone or in combination to provide the desired UV spectral absorbance. Specific examples of non-fluorescing UV edge markers 325 which have both the correct spectral properties and plausibility or usage in printing include Direct Yellow 62, Ciba Tinuvin 171, Ciba Tinuvin 477, Roche Parsol 1789, or Norbloc 7966. The representative UV edge marker 325 of FIG. 6a has marker toe absorption 335 just above 400 nm. The visible colorant 340 modeled in FIG. 6a is Basic Blue 66, a dark blue colorant with a strong red light absorption and minimal UV or IR light absorption. Absorption spectrum 342 depicts Basic Blue 66 in the concentration (c=30.6 mg/L) provided on page 125 of the Sigma Aldrich Handbook of Stains, Dyes, and Indicators (1991). Thus the visible colorant 340 has a color determined by the integrated spectral response of the absorption spectrum 342, together with the illuminant 295, which has a broadband spectrum that is nominally assumed to provide at least white light illumination. Combined absorption spectrum 344 depicts the combination of the modeled UV edge marker 325 and a diluted (c=3.6 mg/L) concentration of Basic Blue 66. The modeled concentration of the UV edge marker 325 was doubled to provide the combined absorption spectrum 344. Notably, in examining the visible spectrum, the UV edge marker 325 and the Basic Blue 66 visible colorant 340 separate significantly in the spectral region of the UV-blue spectral edge 262 and otherwise the spectrum follows the response of the Basic Blue 66. This differential absorption between the UV spectral edge marker 325 and the visible colorant in the UV-Blue spectral edge region 262 provides a difference in print density or optical density $\Delta D$ ($\Delta D = \Delta D_1 = D_{SE(UV)} - D_{VC(UV)}$) that can provide hidden data 220 in a cover work 110.

The modeled results of FIG. 6a suggest the potential for both minimal visible crosstalk and a significant detectable signal when image areas with both the UV edge marker 325 and the visible colorant(s) 340 are compared to adjacent image areas 305 with only the visible colorant(s) 340. Considering first the color question, it is seen that within the visible spectrum, the combined absorption spectrum 344 essentially has the spectra and color of the diluted Basic Blue 66 visible colorant 340. That suggests that in a first appearance state 285, pixels 302 at positions $(x_1, y_1)$ within the hidden data 220 depict the cover work 110 and are color matched to their nominal pixel coloration for those locations of the cover work 110, to within some tolerance. Similarly, the color of image areas with both the diluted Basic Blue 66 and the UV edge marker 325 and adjacent image regions 305 having only the diluted Basic Blue 66 can have nearly the same color, and can be considered to be color matched to within some tolerance (assuming the image content is related). For current purposes, the goal is to color match a pixel having both normal colorants 340 and spectral edge absorbers 320 to the original color within a tolerance, or to color match that pixel to neighboring pixels that have only normal colorants 340 but which nominally have the same original color. In particular, a deviation for color matching or color difference visibility was modeled using the human color matching functions 266 of FIG. 4, to determine that the perceptual difference (ΔE*) between visible colorant 340 (only diluted Basic Blue 66) and the combined absorption spectrum 344 (diluted Basic Blue 66 with the UV edge marker 325) was ΔE*≈0.20 in CIELAB color space. In color science, a tolerance for color perception differences is a barely noticeable color difference, which is quantified as a just noticeable difference (JND), where one JND is equivalent to ΔE*≈1.0 in CIELAB color space. Typically, color differences of 1 or 2 JNDs (ΔE*≈2.0) are considered to be small. As 1 JND is ~5× greater than the color difference provided in the above example, found when comparing the visible colorant 340 (only diluted Basic Blue 66) and the combined absorption spectrum 344 (diluted Basic Blue 66 with the UV edge marker 325), these two cases can be considered color matched, with margin, for all practical purposes.

Figures 6B, 6C:
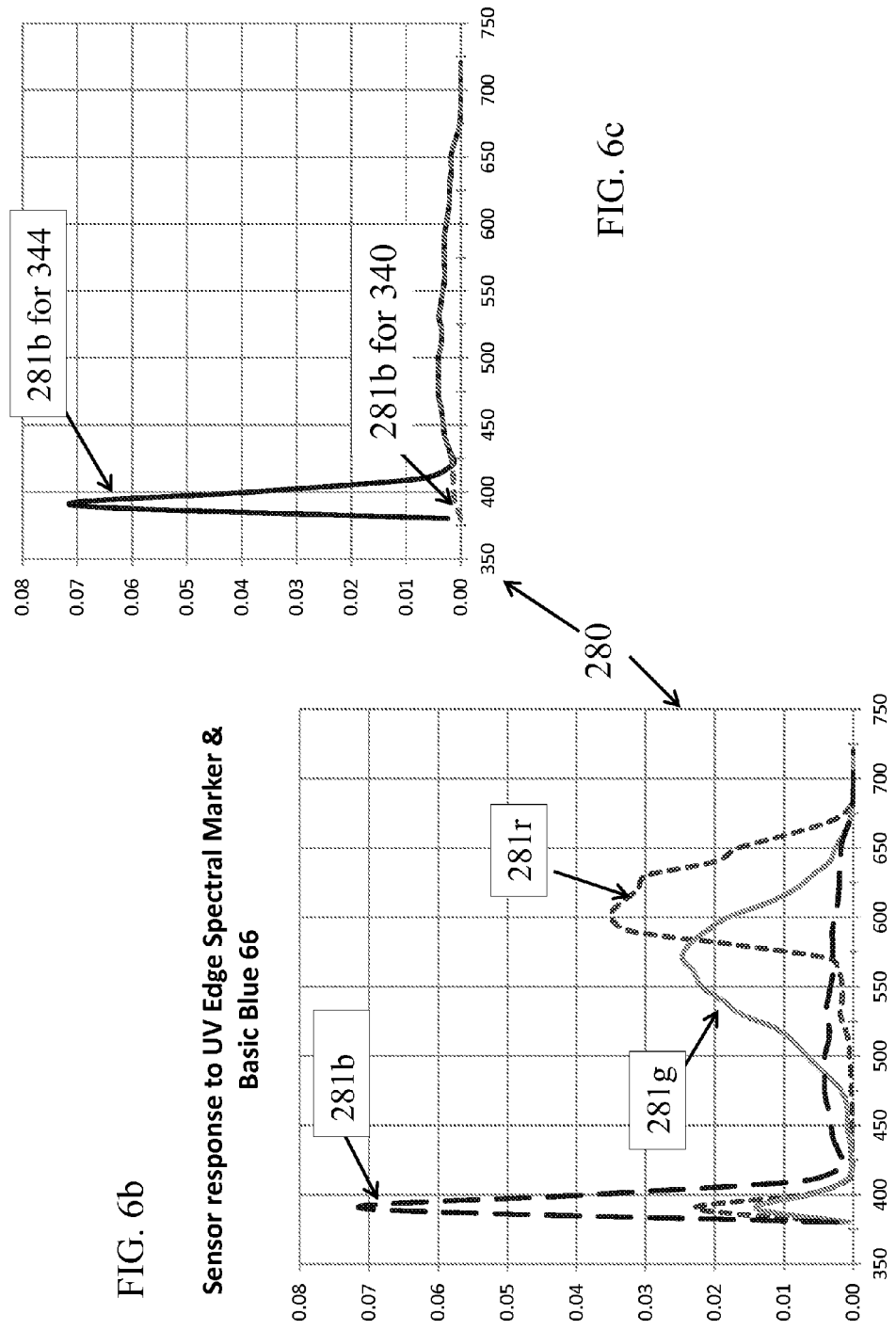
FIG. 6b depicts the modeling of a UV spectral edge marker in combination with an exemplary visible colorant, Basic Blue 66.
FIG. 6c depicts signals of the UV spectral edge marker in combination with the exemplary visible colorant, Basic Blue 66, as detected by an image capture device.

As another aspect of the present invention, obtaining a strong sensor signal for hidden data 220 printed with the UV edge marker 325 is equally important. Using the image capture device spectral response 280 modeled in FIG. 3d and the spectral absorptions shown in FIG. 6a gives imaged color spectral response 280 for each color channel shown in FIG. 6b. As FIGS. 3b and 3d illustrate, all three color channels of the image capture device 250 can have spectral sensitivity in the UV-blue spectral edge 262, but the sensitivity (blue pixels response 261b) for the blue channel is the highest. As a result, when image capture device 250 acquires an image of the printed content of the FIG. 6a example, and reflected light reaches the image sensor 258, the largest imaged color camera response 280 to the density of the UV edge marker 325, is provided by the blue channel pixels, when compared to adjacent image areas 305 without the UV edge marker. This blue pixel response is shown in FIG. 6b as blue pixel signal 281b. To clarify this further, FIG. 6C shows the imaged color camera response 280 for the blue pixels (blue pixel signal 281b) of image capture device 250 that see only the visible colorant 340 (diluted Basic Blue 66) compared to the pixels that see the combined absorption spectrum 344 (diluted Basic Blue 66 with the UV edge marker 325). In FIG. 6c, the signal difference at the spectral peak (390 nm) is ~81×. Integrating the imaged color camera response 280 sampled by the blue pixels (blue pixel signal 281b), such as over the entire spectrum (380-720 nm), gives integrated sensor signals 281b with a signal difference of ≈2.5×. Selective signal integration, over only the 380-410 nm spectral range, can give signals 281b with a signal difference or gain of ≈32×. Taken together, the UV edge marker 325 can provide a large density difference ΔD ($\Delta D = D_{SE} - D_{VC}$) or integrated signal difference with a less than perceptible color change. In this example, the ratio of UV edge marker 325 to visible colorant 340 can be increased by 5×, to provide >10× signal difference for signal integration over the entire spectrum (380-720 nm) with only ≈1 JND deviation from perfect color matching. Likewise, if two JNDs color difference is allowed, ≈25× signal difference for signal integration over the entire spectrum (380-720 nm) is attainable.

A similar analysis to that provided with Basic Blue 66 as the visible colorant 340 can be done for other visible colorants 340. Ideally, to provide large density differences ($\Delta D = \Delta D_1 = D_{SE(UV)} - D_{VC(UV)}$) for hidden data 220 printed with a spectral edge marker 320 that is a UV edge marker 325, the printable visible colorants 340 would have low absorption at the UV-blue spectral edge 262. Exemplary visible colorants 340 with strong red absorption, high blue and green light transmittance and low absorption at the UV-blue edge include Basic Blue 66, Basic Blue 3, or Acid Blue 9. Similarly, exemplary visible colorants 340 with strong green absorption, high blue and red light transmittance and low absorption at the UV-blue edge include Saffrinin, Rhodamine dyes, Acid Red 52, and New Fuschsin. Finally, exemplary visible colorants 340 with strong blue absorption, high green and red light transmittance and low absorption at the UV-blue spectral edge 262 include Basic Orange 14 and Basic Orange 21. The above materials generally also lack significant IR absorption and likely can be used effectively with a spectral edge marker 320 at the Red-IR spectral edge 264. Some of the exemplary visible colorants 340 listed above are known to be commonly used in printing inks, including inkjet inks. Others colorants may be in used in proprietary blends with little public knowledge.

Thus it can be seen that the combination of a spectral edge marker 320 that is a UV edge marker 325 with visible colorants 340 having low optical absorption in the UV-blue spectral edge 262 and a significant visible absorption can provide an absorption spectrum combination that gives both ($\Delta D_1$, $\Delta D_2$) a readily detectable signal for hidden data 220 and small impact on the perception of the combine color compared to the native color of the paired visible colorant(s) 340. The signal difference represents printing latitude or dynamic range that can be used in various ways. For example, the density paired visible colorant(s) 340 can be increased or decreased over a significant print density range in accord with the variable image content, without revealing the UV edge marker 325 or masking its detectability by the camera 250. Additionally, the density range of the UV edge marker 325 can be used to encode hidden data 220, providing bit depth ($2^N$ bits, e.g., where N=4 or N=8) or hidden data code values, and increasing the data capacity of the digital watermark or other data.

Figure 7:
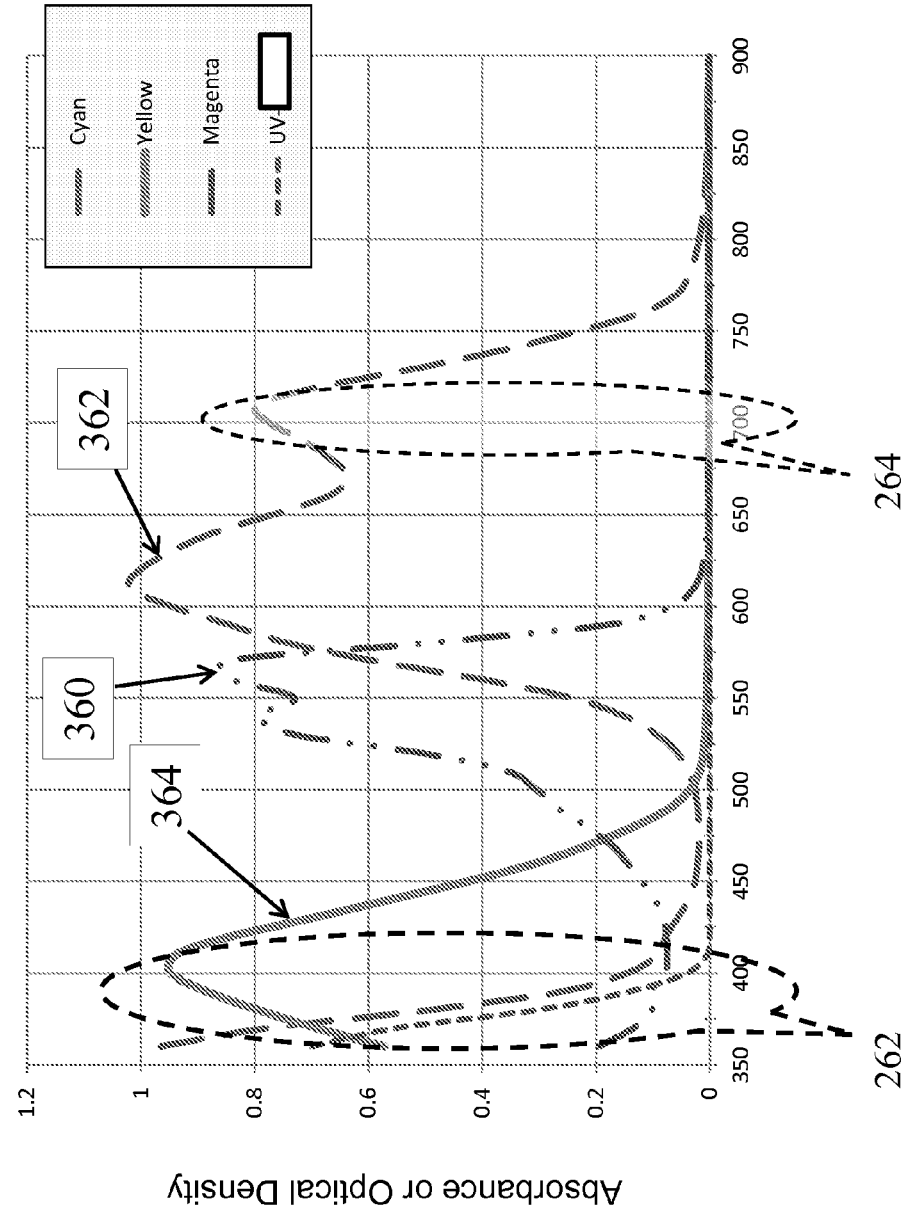
FIG. 7 depicts light absorption spectra for commercially available inkjet inks.

As another example, the application of the present inventive method of applying a UV edge marker 325 at the UV-blue spectral edge 262 is considered with respect to using normal printing process colorants, including, common inkjet printing inks, instead of the exemplary visible colorants 340 given previously. In particular, FIG. 7 depicts exemplary absorption spectra for a set of cyan, magenta, and yellow (CMYK) inkjet inks sold by Eastman Kodak Company. Commonly available normal process inkjet inks from other companies, such as Epson, HP, Canon, and Lexmark, have similar spectral absorption profiles. As can be seen, the magenta ink 360 has an advantageously low spectral absorption at the UV-blue spectral edge 262, and results similar to that of FIGS. 6a-6c can be expected. By comparison, the cyan ink 362 has a comparable spectral absorption at 400 nm, but the absorption is rising more quickly than the magenta going into the UV, suggesting that using a UV edge marker 325 is also possible with cyan ink, though perhaps with less dynamic range. In the case of low density printed patches of cyan ink 362, use of a combination spectral edge marker with density at both the UV-blue spectral edge 262 and the Red-IR spectral edge 264 can be particularly useful, as a data correlation process can confirm marker signals 350 for hidden data 220. The yellow ink 364 has considerable density at the UV-blue spectral edge 262 and significant use of a UV edge marker 325 is unlikely. As the yellow ink 364 has little density at the Red-IR spectral edge 262, use of an IR spectral edge marker 330 can be useful.

Pairing spectral edge markers 320 with standard carbon black based black (K) inks is more difficult, as such normal printing process inks typically have a broad light absorption spectrum extending from the UV, through the visible, and into the IR. However, as the absorption density tends to diminish entering the IR, having about half the magnitude at the Red-IR spectral edge 264 as at the UV-blue spectral edge 262, use of IR edge markers 330 has greater potential. Using the spectral edge markers 320 with low density content (greys) with carbon black inks or using black inks that have low light absorption at the UV-blue spectral edge 262, the Red-IR spectral edge 264, or both, is also viable.

Figure 8A:
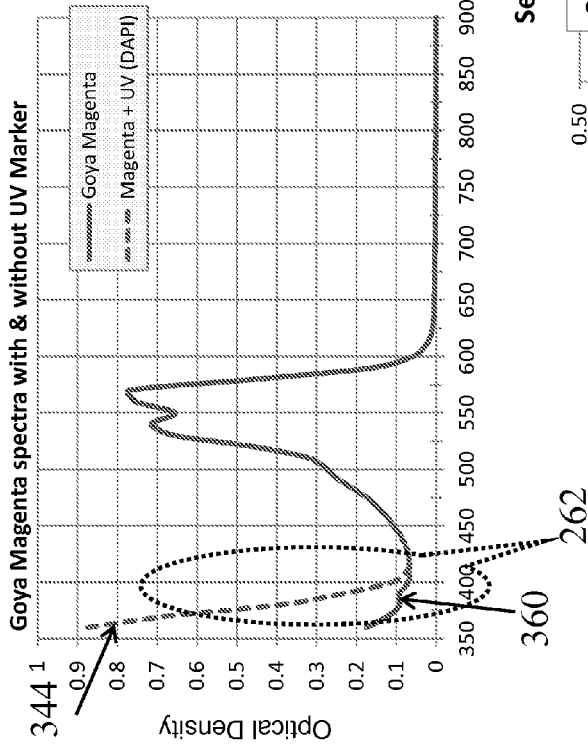
Figure 8B:
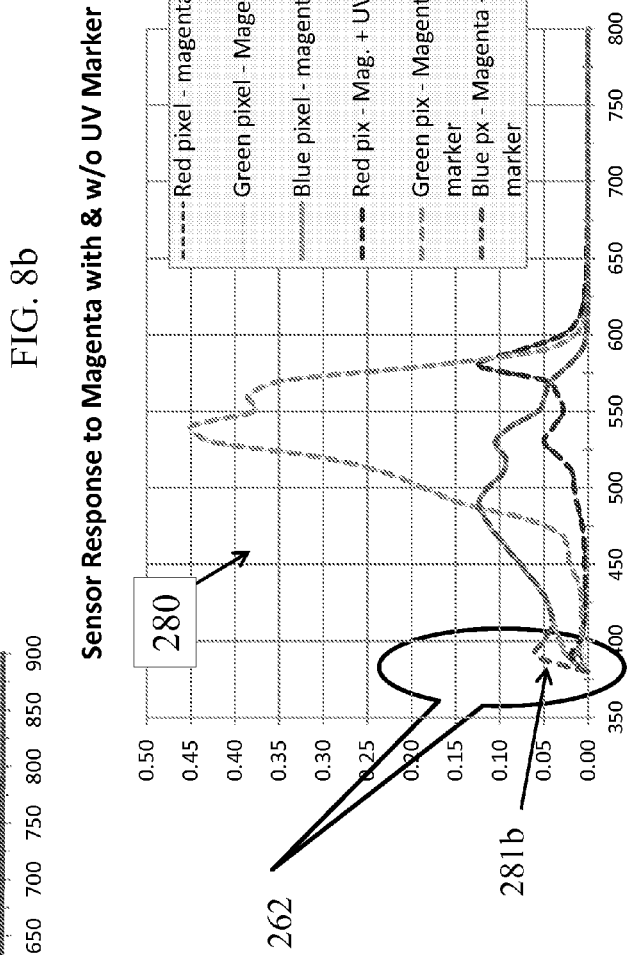

Indeed, FIG. 8a depicts a combined absorption spectrum 344 for the mid tone density magenta ink 360 in combination with a representative UV edge marker 325 compared to the magenta ink 360 alone. The two spectra are nearly identical within the visible spectrum, and thus color matched with virtually identical color appearances. Indeed, the perceptual color difference $\Delta E^*$ for the magenta ink 360 compared to the magenta ink 360 in combination with the UV edge marker 325 are small, and are comparable to those shown in the FIG. 6a example. FIG. 8b then depicts the imaged color camera response 280 of the image sensor 258 for each of the three color pixels (red pixels signals 281r, green pixel signals 281g, blue pixel signals 281b) for the magenta ink 360 and for the magenta ink 360 in combination with the UV edge marker 325. In this example, the spectral differences are small, and integration of the imaged color camera response 280 for the blue pixels (blue pixel signal 281b) over all wavelengths gives signals 281b for the two ink sets with only a 4% signal difference. That difference certainly can be detected by a processing algorithm, but without the dynamic range of the FIGS. 6a-6c example using Basic Blue 66 instead of this exemplary magenta ink. Spectrally limited integration of the blue channel signals over a 380-410 nm spectrum at the UV-blue spectral edge 262 gives signals 281b having a signal gain of ≈1.61× when using the UV edge marker 325. As another example, if the density of the magenta ink 360 is reduced ~4× while keeping the amount of UV edge marker 325 constant, the full spectrum integrated signal difference that represents the hidden data signal increases to 18%.

In considering FIGS. 8a and 8b, it can be seen that there is potential range of applications for using the magenta ink 360 in combination with the UV edge marker 325. Increasing the UV edge marker 325 density and/or decreasing the magenta ink 360 density will improve detection of hidden data 220. Clearly, the magenta ink 360 can be paired with the UV edge marker 325 to provide hidden data 220 for low (such pastel like colors) and mid-density magenta printed content, whether the magenta image content has a flat field density or a variable density. FIGS. 6B and 8b also show that the green and red pixels can respond to the presence of the UV edge marker 325, because the exemplary image capture device spectral response 280, shown in FIG. 3d, provides residual green and red sensitivity at the UV-blue spectral edge 262. Other image sensors 258 may not have this response. In this case, correlation of image differences for hidden pattern content (220) with the UV edge marker 325 compared to adjacent image areas 305 without it, for two or more color channels, can be used to help find a faint hidden pattern 220.

Similarly, FIG. 8c depicts an absorption spectrum 342 for an exemplary combination of low density cyan ink 362 with a UV edge marker 325. The perceptual color difference $\Delta E^*$ for the cyan ink 362 compared to the combined absorption spectrum 337 for the cyan ink 362 in combination with the UV edge marker 325 are small, and are comparable to those shown in the FIG. 6a example. FIG. 8d then depicts the imaged color camera response 280 of the image sensor 258 for each of the three color channels for the cyan ink 362 and for the cyan ink 362 in combination with the UV edge marker 325. In this example, the spectral differences are small, and integration of the blue pixel signals 281b over all wavelengths for the two ink sets gives signals 281b with a 35% signal difference. That difference certainly can be detected by a processing algorithm, but without the dynamic range of the FIGS. 6a-6c example with Basic Blue 66. Spectrally limited integration of the blue pixel signals 281b over a 380-410 nm spectrum at the UV-blue spectral edge 262 gives a signal gain of ≈2.55×. Thus, it is seen that a UV edge marker 325 can paired with cyan ink 362 in cyan image areas, such that a detectable UV signal is provided with little perceptual color change. Again raising the exemplary low density of the UV edge marker 325 to improve detection or add bit depth is possible. However, in comparing FIG. 8c for the exemplary cyan ink 362 and UV edge marker 325 to FIG. 8a for the exemplary mid-density magenta ink 360 and UV edge marker 325, the case with the cyan ink 362 has more signal discrimination, but less density. Thus the cyan ink density can be increased, either in flat fields or variable density image areas, while still enabling embedded hidden data 220. Additionally, the exemplary cyan ink 362 and magenta ink 360 can be printed to the same image pixels, to provide an expanded color palette of combination colors for which hidden data 220 can be enabled with a UV edge marker 325. It should be understood that hidden data 220 can be printed selectively within areas of a cover work 110, or throughout the entire cover work 110, depending on the image content, and the spectral properties of the spectral edge markers 320 and the visible colorants 340.

Printed Example

Several sets of density patches were printed and scanned using a spectral densitometer. For the UV edge marker 325, a dispersion of CIBA Tinuvin-171, which is a UV light absorber of the hydroxyphenylbenzotriazole class, was used. CIBA Tinuvin-171 is a viscous liquid at room temperature that can easily be emulsified with surfactant using ethyl acetate to provide a particle around 150-200 nm in size. The resulting CIBA Tinuvin-171 particles are not prone to crystallization and are very hydrophobic, enabling a well dispersed printing solution.

Figure 8E:
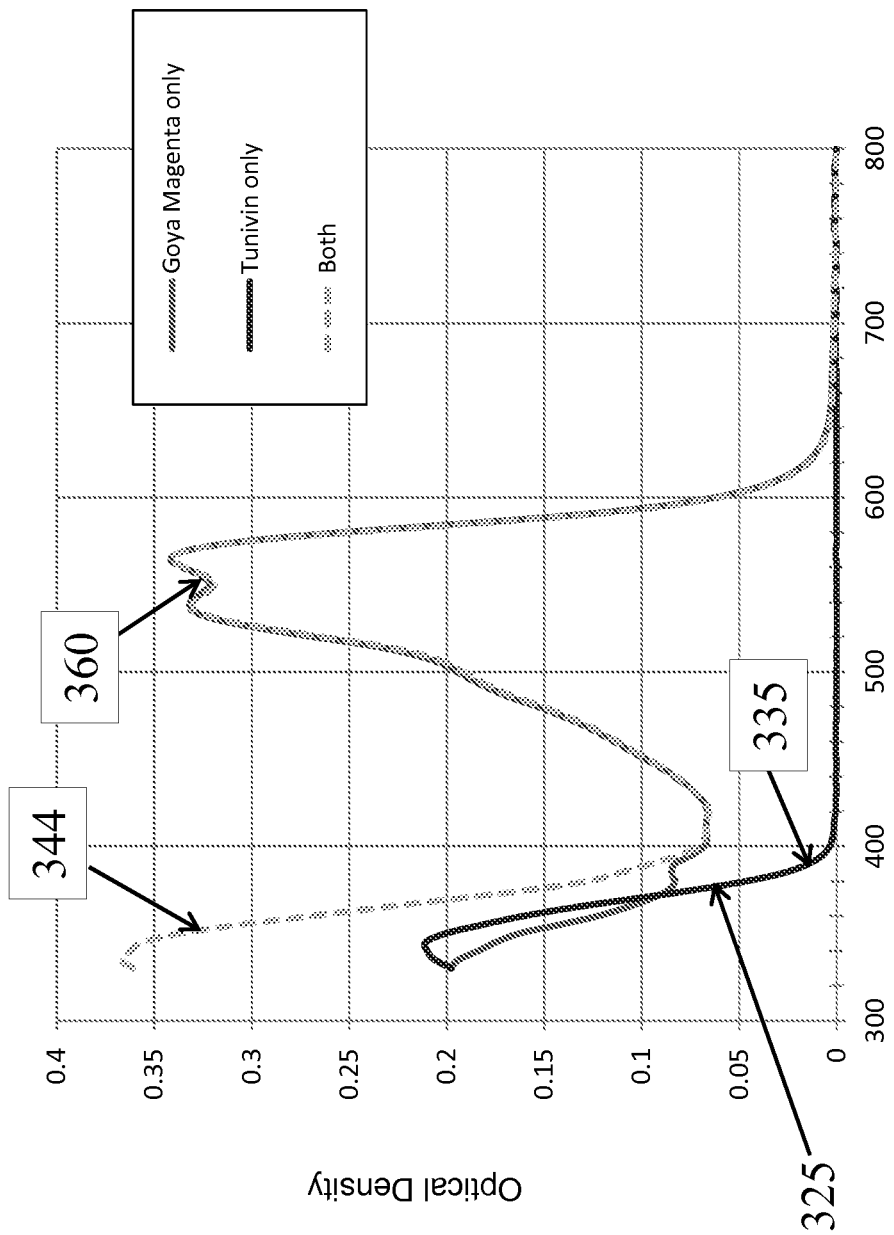
FIG. 8e depicts measured absorption spectra from test patch printing with an exemplary UV spectral edge marker.

FIG. 8e provides exemplary measured data where a 1× concentrated solution of CIBA Tinuvin-171 UV edge marker 325 was patch printed by itself, and in combination with a visible colorant 340. The visible colorant 340 was the same exemplary magenta ink 360 shown in FIG. 7. This magenta ink 360 contains sub-micronic quinacridone pigment particles and is further formulated with surfactants and humectants commonly used in the art of inkjet inks FIG. 8e shows that the absorption spectrum 342 for the exemplary magenta ink 360 and the combined absorption spectrum 344 for the combination of the exemplary magenta ink 360 and the CIBA Tinuvin-171 UV edge marker 325 essentially track together from 400-700 nm. Below 400 nm, the two spectra significantly separate. For the purpose of the present invention, CIBA Tinuvin-171 by itself, is not an optimal UV edge marker 325. The UV absorption density starts to increase with marker toe absorption 335 at ≈390 nm. Preferably the marker toe absorption 335 would be at ≈405-420 nm instead. As a result, the printed example of FIG. 8e can provide ~19% greater integrated signal 281b from spectrally limited integration of the blue pixel signal 281b between 380-400 nm when adding the CIBA Tinuvin-171 UV edge marker 325, compared to less than 1% greater integrated signal 281b between 380-700 nm. Of course, printed examples with less density of the magenta ink 360 for the same concentration of CIBA Tinuvin-171 would provide greater integrated signal for the hidden data 220 without jeopardizing color difference visibility.

Figure 9A:
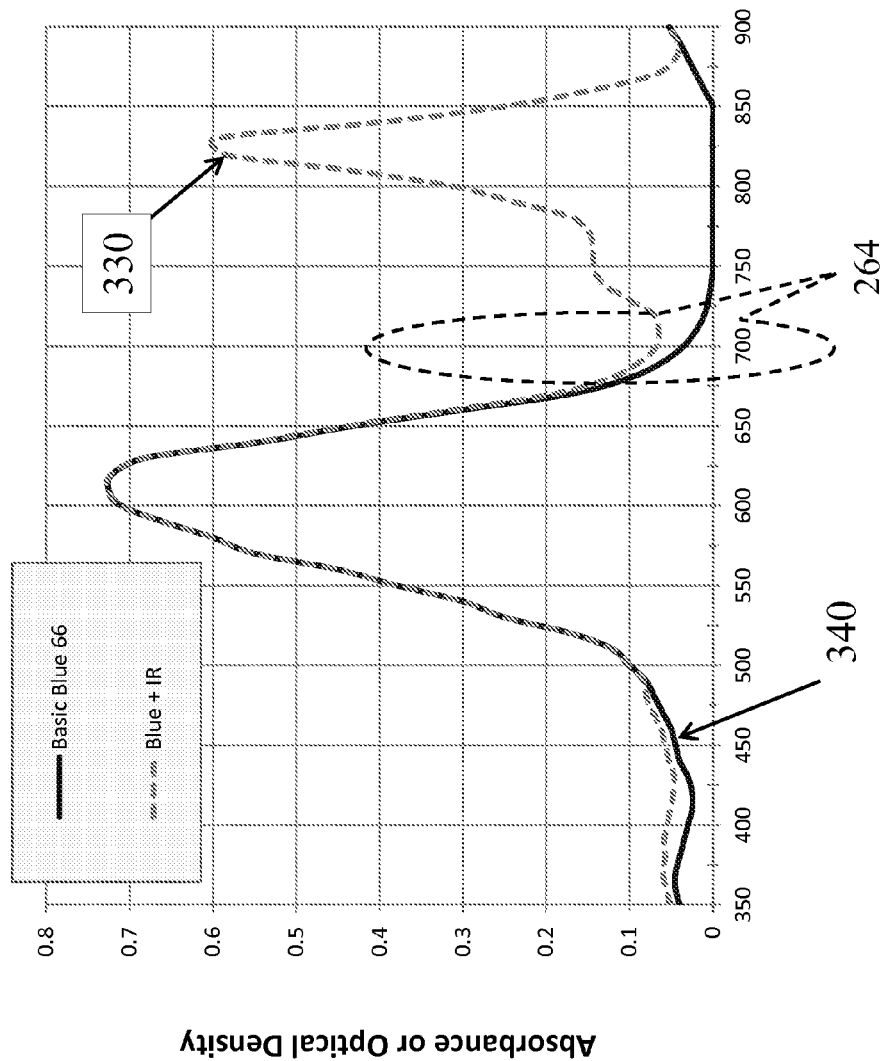
FIG. 9a and FIG. 9b depict an IR spectral edge marker in combination with an exemplary visible colorants, Basic Blue 66 and yellow inkjet printing ink, respectively.
Figure 9B:
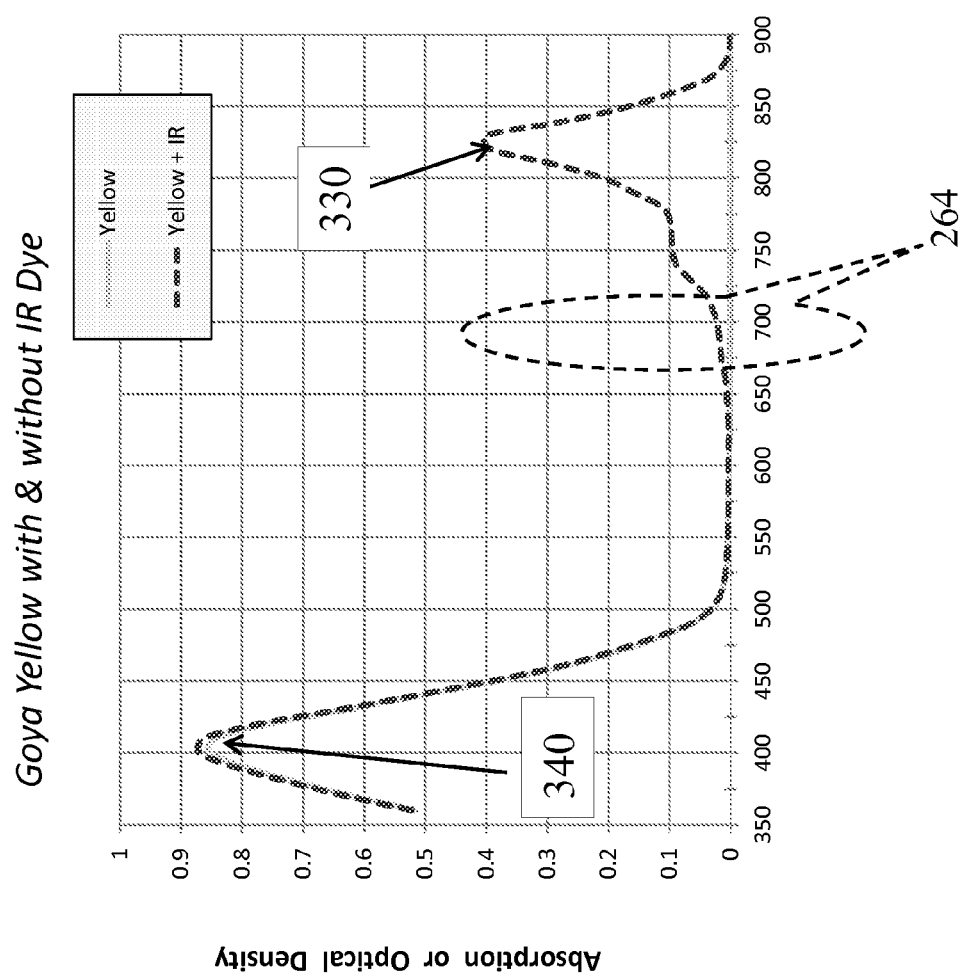

Continuing with development of spectral edge data hiding in printed matter (300), thus far the analysis and examples have been directed at the use of a UV edge marker 325 operating at the UV-blue spectral edge 262. Consideration is now given to the use of a spectral edge marker 320 that is an IR edge marker 330 operating at the Red-IR spectral edge 264, as shown in FIGS. 9a and 9b. The modeled IR edge marker material (330) is a variant of the "Trump Dye", and is similar to the IR dye described in commonly assigned U.S. Pat. No. 6,361,916 (Chen et al.). This dye provides a strong IR absorption at 830 nm, which is nominally beyond the spectral sensitivity of the image capture device 250 having IR filter 256. FIG. 9a shows this IR edge marker 330 in combination with visible colorant 340 that is Basic Blue 66, which was previously paired with an UV edge marker 325 in FIG. 6a, although similar results were obtained using the exemplary IR edge marker 330 with the exemplary magenta ink 360. As can be seen in FIGS. 9a, 9b, the modeled IR edge marker 330 has a shoulder or intermediate light absorption extending from 725-775 nm, which is generally attributable to excitation of higher energy states or the presence of alternate molecular conformations. Residual visible light absorption (broad visible marker absorption 337) occurs in the red, tailing off as the wavelength drops from 725 to 625 nm, and then residual absorption re-appears below 475 nm. It is these absorption losses that typically give IR dyes a residual coloration (such as green tint) and limit their density. In the case of FIG. 9a, small color absorption differences appear above 675 nm and below 475 nm, as compared to the baseline Basic Blue 66 absorption spectrum, which will provide deviations from perfect color matching. By comparison, in the example of FIG. 9b, less IR dye has been provided for the IR edge marker 330 in proportion to the modeled amount of visible colorant 340 (the latter being exemplary yellow ink 364), than was used in proportion to the amount of visible colorant 340 (Basic Blue 66) in the FIG. 9a example. Color differences are again visible at the Red-IR spectral edge 264, and less so around 400 nm.

In the first example, FIG. 9a with Basic Blue 66, the modeled color difference visibility using color matching functions 266, comparing the cases with and without the IR edge marker 330, $\Delta E^*$ is ~2.2 JNDs, which is a color mismatch that can provide visible discoloration in flat color fields upon careful examination, but which would be less noticeable in mottled color patch areas. These color differences are as modest as they are, because the color appearance is dominated by the visible light absorption hump around 600 nm (for $\Delta D_2 = D_{VC(VIS)} - D_{SE(vis)}$; $D_{vC(VIS)} > D_{SE(vis)}$). In this case, lowering the maximum proportional amount of IR edge marker 330 accompanying visible colorant 340 (Basic Blue 66), by 1.5× to 2× for example, can be useful. For the second example, FIG. 9b with the yellow ink 364 as visible colorant 340, the modeled color difference visibility using color matching functions 266, comparing the cases with and without the IR edge marker 330, $\Delta E^*$ is ~0.8 JND (close to a color match). In this instance, the maximum proportional amount of IR edge marker 330 accompanying visible colorant 340 (yellow ink 364) can be increased, to at least 1 JND levels, and perhaps closer to 2 JND levels. These examples suggest that the IR edge markers 330 can be printed with variable densities and printed in image content areas with variable visible colorant densities from one or more visible colorants 340, to successfully hide data without causing visually perceptible artifacts.

For both of these examples involving IR edge markers 330, the density differences $\Delta D1 = D_{SE(IR)} - D_{VC(IR)}$ for the IR spectral edge markers 330 indicate that a measureable signal for detecting hidden data 220 is achievable. As with the UV spectral edge markers 325, the density differences for the combination of IR edge markers 330 and visible colorants 340 are preferably large enough to provide a string hidden data signal and minimal color mismatch [e.g., $\Delta D_{1(IR)} \geq 0.2$; $\Delta D_{2(IR)} \geq 0.3$]. Graphs of image color camera response 280, similar to those of FIGS. 6b, 8b, and 8d, can be provided, including estimates of the integrated signals (281r) and differences thereof, for cases with and without the IR edge marker 330. As noted previously, the modeled image capture device spectral response 280 of FIG. 3d was calculated using the intermediate IR filter 256b of FIG. 3c. While the IR filter 256b enables some sensitivity from image capture device 250 in the 680-700 nm portion of the Red-IR spectral edge 264, an alternate IR filter 256 can be better for this purpose. This can be an IR filter 256 that is shifted towards the IR, or a wider bandpass filter, or a filter that has a spectral width and positioning to straddle both the UV-blue spectral edge 262 and the Red-IR spectral edge 264. IR filter 256c of FIG. 3c provides an example of this latter case. Essentially, a combination of an IR filter 256c and IR edge marker 330 can be provided where a color difference at the Red-IR spectral edge 264 can be both provided and detected, providing signals 281r that have detectable differences of a few percent or more, while staying below likely perception of color difference thresholds.

However, in the examples presented in the present application, UV edge markers 325 function as better spectral edge markers 320 than do the IR edge markers 330. In part this is because the exemplary UV edge markers provide an abrupt transition from high absorptance to low absorptance as the absorption spectra transitions into the visible band 310. Additionally, using spectral edge markers 320 at the UV-blue spectral edge 262 provides a better result because the image capture device spectral response 280, as shown in FIG. 3d, can provide a more abrupt transition in sensitivity at the UV-blue spectral edge 262 than at the Red-IR spectral edge 264. Thus UV edge markers 325 can provide a signal for hidden data 220 that is easier to discern (larger signal to noise ratio) or has a higher bit depth and more data capacity. Moreover, within the UV-blue spectral edge 262 region, and particularly under ~415 nm, visual sensitivity, as indicated by the blue (or short) human color matching function 266 of FIG. 4, decreases much more rapidly than does the exemplary image capture device spectral response 280 for blue pixels shown in FIG. 3d, enabling detectable signals for hidden data 220 with small (marginally perceptible) color changes.

By comparison, in the examples presented in the present application, IR edge marking is disadvantaged. Additionally, near 700 nm, the red (long) and green (middle) human color matching function 266 of FIG. 4 tail off in a similar way to the image capture device spectral response 280 for red pixels shown in FIG. 3d. The effectiveness of IR edge markers 330 in providing hidden data 220 can be improved in various ways. As noted, the exemplary IR edge marker 330 shown in FIGS. 9a, 9b has the long shoulder of intermediate light absorption that creates extended visible band crosstalk. Substituting alternate IR edge markers 330 with abrupt IR absorption profiles, such as materials using rare earth elements or minerals, or nano-particles such as core-shell quantum dot structures, can aid the purposes of the present invention. Additionally, for a circumstance like that of the image capture device spectral response 280 of FIG. 3d, providing an IR edge marker with an abrupt increase in absorption at ~670 nm, within the spectral region where the red pixel camera response rises quickly, can be helpful. Alternately, equipping an image capture device with an IR filter, such as IR filter 256c of FIG. 3C, have an IR cutoff closer to 700 nm, would also enable more IR signal with little visual impact to color matching. However, as use of an IR biased IR filter, such as IR filter 256c of FIG. 3C, may impact the color image capture and reproduction of the image capture device 250 as relates to normal picture taking use, rather than detection of digital watermarks and other hidden data 220, care is required.

In summary, it is seen that the combination of a spectral edge marker 320, whether a UV edge marker 325 or an IR edge marker 330, can effectively provide hidden data 220 when the visible colorants 340 have a significant visible light absorption but low or minimal optical absorption at the appropriate human vision spectral edge (the UV-blue spectral edge 262 or the Red-IR spectral edge 264 respectively). As noted previously, the spectral edge markers 320 preferably provide a substantial spectral absorption just outside the human visible spectrum, by for example, providing an optical density (or absorbance) $D_{SE} \geq 0.3$, and preferably $D_{SE} \geq 0.5$ or $D_{SE} \geq 1.0$. By comparison, the visible colorants 340 are intended to provide a low optical absorption or optical density in this same spectral region where the spectral edge markers 320 operate. In an absolute sense, it is easiest if the visible colorants 340 have an optical absorption density $D_{VC} \leq 0.3$ and preferably $D_{VC} \leq 0.1$. On a comparative basis, the optical absorption of the visible colorants 340 should be significantly less than the optical absorption of the spectral edge markers 320 at the spectral edge (262 or 264) of interest. For example, expressed as density difference ΔD, the absorption density of the visible colorants 340 should be less than that of the spectral edge markers 320 by $\Delta D = \Delta D_1 = D_{SE} - D_{VC} \geq 0.2$ and preferably $\Delta D_1 \geq 0.5$ or $\Delta D_1 \geq 1.0$. Equivalently, it can be said that the visible colorants 340 should be ~⅓ less light absorbing than the spectral edge markers 320, if not ⅔ less, or 1/10$^{th}$ less or more, within the spectral edge (262 or 264) of interest. In particular, under such circumstances, both a readily detectable signal for hidden data 220, that provides printing latitude or dynamic range, and a small visual color crosstalk or color error artifacts (e.g., ΔE* in JNDs) can be achieved. It is noted that practice of the present invention for spectral edge based digital watermarking or steganography is dependent on properties of the spectral edge markers 320, visible colorants 340, the print media 200, the image capture device 250, and the digital watermark processing methodology. These various issues will now be explored in some further detail.

On the other hand, the visible colorants 340 should provide substantially more light absorption in the visible spectrum than do the spectral edge absorbers 320. This has been illustrated by example, with respect to FIGS. 6a, 8a, 8c, and 9a,b. For example, with respect to FIG. 9a, it was observed that the visible colorant 340 Basic Blue 66 provides a "hump' of light absorption around 600 nm, that by comparison is large relative to the crosstalk visible light absorption of the spectral edge markers 320 (325, 330). As a result, the spectral edge markers 320 cause only a small color change when adding to the visible colorants 340, as indicated by color perception differences ΔE* values or JNDs. Alternately, the desired substantial difference in light absorption in the visible spectrum between the visible colorants 340 and the spectral edge absorbers 320 can be quantified more directly, for example, using optical densities (D). As with the absorption comparisons in at the spectral edges 262 or 264, benchmark or thresholds based on spectrally integrated densities (D) for the spectral width matching the illuminant would give a good measure. However, as that can be difficult to assess, peak densities and average density differences ΔD can be used instead. For example, preferably, the visible colorants 340 provide a peak visible density $D_{VC(vis)} \geq 0.5$, if not $D_{VC(vis)} \geq 1.0$ or more. As the typical visible colorants have spectrally broad absorption spectra, if that condition is held, than the average visible colorant density $D_{VC(vis)}$ will likely be sufficient. Alternately, it can be stated that the average visible density difference $\Delta D_2$ between the visible colorants 340 and the spectral edge absorbers 320, for the spectral width matching the illuminant, should preferably be $\Delta D_2 = D_{VC(vis)} - D_{SE(vis)} \geq 0.3$ or more, although the average density difference can be lower, depending on the visible crosstalk of the spectral edge absorber 320 (e.g., see FIG. 8c, where $\Delta D_2 \approx 0.2$).

Notably, it should be understood that the visible colorants 340 and the spectral edge markers 320 described herein can be applied as various forms of donor material, such as ink, wax, paste, or toner. Generally the term "ink," describes a liquid or paste used especially for writing or printing, which typically includes a visible colorant 340 with broad visible marker absorption 337 (typically pigment or dye), a solvent, a vehicle, and additives, as appropriate. It is generally understood that with inks, dyes are colorant molecules in solution, while pigments are colorant particulates in solution. Dyes suitable for use as visible colorants 340 include, but are not limited to, those commonly used in the art of inkjet printing. For aqueous-based ink compositions, such dyes include water-soluble reactive dyes, direct dyes, anionic dyes, cationic dyes, acid dyes, food dyes, metal-complex dyes, phthalocyanine dyes, anthraquinone dyes, anthrapyridone dyes, azo dyes, rhodamine dyes, solvent dyes and the like. However, selection of visible colorants 340, and ink compositions thereof, having low light absorption at the UV-blue spectral edge 262, the Red-IR spectral edge 264, or both, can be advantageous for use of the present invention. Also, for the purposes of the present invention, it should be understood that the term "ink" also includes an alternate printing composition with donor material that at least includes a spectral edge marker 320, which can be a UV edge marker 325, or an IR edge marker 330, or individual or mixed combinations thereof, [$m_1, m_2, m_3, \ldots$], that can further include visible colorants or spectral markers.

While it is commonplace to load donor material (visible colorant 340 or spectral edge markers 320) into a printing ink as dye or pigment, for the purposes of the present invention, use of encapsulated ink particles 400 can be advantageous, as shown in FIGS. 10a-10e. To begin with, many invisible ink materials, and particularly infrared light absorbing materials, can be unstable, and suffer chemical degradation including dye fade, with environmental exposure, including light, oxygen, or humidity exposure. To combat this, commonly assigned U.S. Pat. No. 6,361,916 (Chen et al.), provides a latex invisible ink that is good for low dye concentrations having composite particles comprising IR dye, stabilizer, and hydrophobic polymer. Dye encapsulation approaches can be useful for the present invention to provide higher concentrations of spectral edge markers 320. As noted previously, with higher spectral edge marker concentrations, the risk of spectral crosstalk into the visible band 310 presents a greater risk of unintended color perception by human observers, moderated by color matching within acceptable JND tolerances. However, encapsulation approaches that embed one or more spectral edge markers 320 within visible light modifying materials can increase masking of the color crosstalk, as well as shield the spectral edge markers 320 from environmental degradation.

Accordingly, FIGS. 10a-10d depicts exemplary ink particle structures where spectral edge markers 320 are embedded within at least one outer visible light modifying layer. In particular, FIG. 10a depicts exemplary encapsulated ink particles 400, and in particular flake particles 410 having outer visible optical layers 430 and an inner spectral edge marker layer 440. The inner spectral edge marker layer 440 includes spectral edge marker materials (320), which can be a UV edge marker 325, or an IR edge marker 330, or combinations thereof, and include the exemplary materials discussed previously. In essence, if the outer visible optical layers 430 significantly alter (absorb or reflect) incident visible light while having little impact on transiting UV or IR light, than the UV or IR light can pass through to the embedded spectral edge marker 320, and be modified by it, and the density of the spectral edge marker 320 can be increased, as visible spectrum crosstalk is masked by the overlying outer visible optical layers 430. In the example of FIG. 10a, the outer visible optical layers 430 can each be multilayer dichroic optical coatings which reflect visible light and transmit UV light, IR light, or both. For example, the outer visible optical layers 430 can be a cold mirror coating that reflects red, green, and blue light with generally equal efficiency and is therefore a white light reflector. Alternately, the dichroic type of outer visible optical layers 430 can reflect differing amounts of red, green, and blue light, providing a pronounced colored reflection that can help mask color differences caused by the underlying visible crosstalk of the embedded spectral edge marker 320 to within an acceptable tolerance (1-2 JNDs). To fabricate flake particles 410, the multilayer structure of outer visible optical layers 430 and the inner spectral edge marker layer 440 can be optically coated on a soluble substrate and subjected to a mechanical fracturing process. The substrate can then be dissolved, leaving small flakes (5-20 μm across) that can be prepared in an ink solution for printing, for example using a process similar to that provided in U.S. Pat. No. 5,383,995 (Phillips et al.) to make optically variable inks (OVI). The inner spectral edge marker layer 440, can for example be formed with a curable solgel or solgel polymer as carrier for the spectral edge marker 320. This can both help the encapsulation and the fracturing.

By comparison, FIG. 10b depicts an alternate exemplary encapsulated ink particle 400 of the flake particle type (410) having visible dye layers 435 surrounding the outer visible optical layers 430 and an inner spectral edge marker layer 440. Adding dye layers can mask both the glassy appearance of the flake particles 410, and reduce or eliminate the variable reflectivity of color or spectra with angle. Unlike optically variable inks (OVI), which are meant to provide obvious color shifting effects, such as for protecting currency form counterfeiting, for the applications of the present invention, hidden data 220 is desired, and both a glassy appearance and angularly variant reflections are undesirable. Additionally, use of visible dye layers 435 can provide greater control in producing the desired flake color appearance.

FIG. 10c depicts a third exemplary encapsulated ink particle 400 that has visible dye layers 435 directly surrounding the spectral edge marker layer 440 on either side. As many visible dyes, such as Basic Blue 66, shown in FIGS. 6a and 9a, can have a visible spectral absorption profile that provides coloration, while being UV or IR light transmitting at least near the UV-blue spectral edge 262 or the Red-IR spectral edge 264 respectively, the goals of transmitting light to interact with the spectral edge marker 320 while hiding associated visible color crosstalk can be met. One or both of the visible dye layers 435 and the spectral edge marker layer 440 can be formed using polymers, solgels, or other materials as carriers or binders.

FIG. 10d shows an alternate encapsulated ink particle 400 that is a core shell particle 420, having a generally spherical cross-section, with the spectral edge marker layer 440 surrounded by the visible dye layer 435. Although core shell particles 420 and flake particles 410 can use similar carrier or binder materials, the core shell particles 420 can be easier to fabricate. FIG. 10e shows an alternate encapsulated ink particle 400 that is a dispersed particle 415, where the spectral edge marker 320 and the visible colorant 340 are nominally distributed uniformly throughout. Environmental or optical encapsulation can be somewhat compromised with the dispersed particle 415, but they can be easier yet to fabricate. Commonly assigned U.S. Pat. No. 6,361,916 (Chen et al.) provides an exemplary method for stabilizing non-visible absorbing dyes in particles (415) having generally dispersed components.

Of course, inks comprising visible colorants 340 and spectral edge markers 320 can be printed directly to the print media 200 without using encapsulated ink particles 400. It should be understood that the visible colorants 340 and the spectral edge markers 320, and the inks including them, can be printed in either order. Overprinting spectral edge markers 320 with the visible colorants 340 can help mask visible crosstalk (marker toe absorption 335 and broad visible marker absorption 337), allowing higher spectral edge marker densities to be used. Of course, best results are obtained if the visible colorants 340 are generally transmitting at the visible spectral edge where the spectral edge marker(s) 320 is operating. However, merely overprinting can be inadequate for environmental protection of the spectral edge markers 320 and use of stabilizers or encapsulation can still be useful, particularly for IR edge markers 330.

In the context of the present invention, printing hidden data 220 with spectral edge markers 320 is a form of functional printing or intelligent printing that enables a wide variety of applications, including advertising or smart packaging. Printed matter (300) using this spectral edge data hiding technique is a broad term that includes, but is not limited to, magazines, posters, post cards, envelopes, brochures, flyers, books, booklets, newspapers, currency, passports, tickets, or receipts. As shown in FIG. 2*b*, the exemplary spectral edge marker printed matter (300) of the present invention is a cover work 110 on a print media 200 having an image 210 and text. Exemplary hidden data 220, which includes text, numbers, musical notation, or a sound track, and machine readable codes, can be provided within the image 210, the text, or the surround. Exemplary content for a cover work 110 includes images, text, constant density or gradient density colored fields or gray fields. Although the print media 200 or receiver 510 is generally meant to be paper, it should be understood that the method of the present invention for creating and printing hidden data 220 with spectral edge markers 320 can provide printed matter, including cover work 110 typically having text or images, on any appropriate type of media or substrate. Acceptable types of print media 200 or receiver 510 include, but are not limited to, paper, cardboard, cloth or other textiles, plastic or polymer surfaces or substrates (transparent or opaque), glass, metal sheet, multi-layer composite materials, or variations and combinations thereof. Print media 200 can be pre-coated or post-coated (e.g., for gloss, sealing, or lamination), relative to printing cover work 110 and hidden data 220, as appropriate. As factors such as dot gain (ink spreading) can vary with print media 200, for either spectral edge markers 320 or visible colorants 340, and can be adjusted appropriately to yield the desired results.

Figure 11:
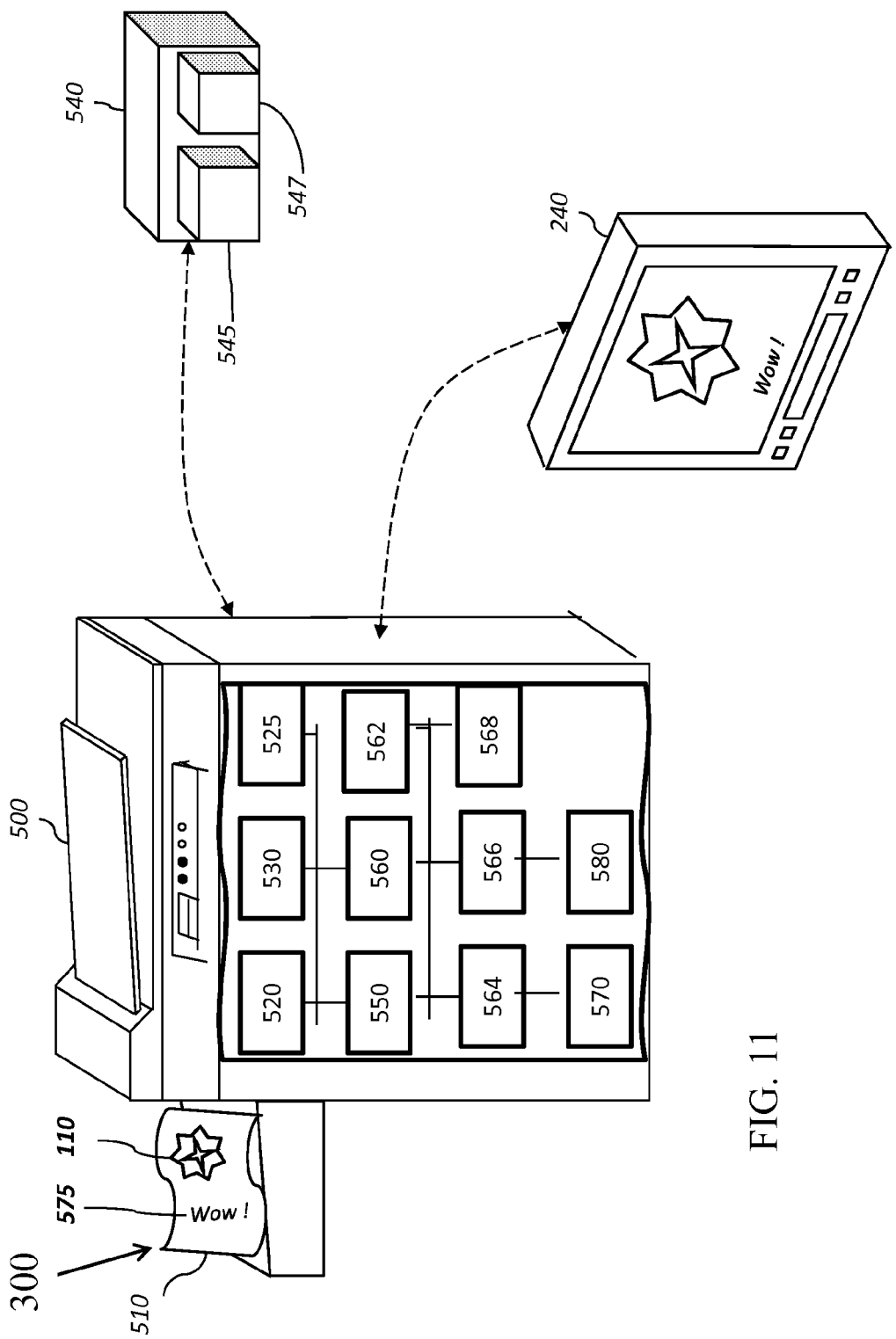
FIG. 11 depicts an exemplary printing system.

FIG. 11 shows an exemplary embodiment of a printer 500 for printing spectral edge marker printed matter 300. Printer 500 has a print engine 520 and a receiver transport system 530 that are controlled by a printer controller 550 to print image on a receiver 510 or print media 200. Print engine 520 has at least two printing stations 525 that can be used to individually apply donor material such as a toner, ink, or wax, on receiver 510, where each donor material contains a spectral marker, so that a plurality of spectral markers can be applied to receiver 510. The plurality of spectral markers, many of which are inks or colorants, includes one or more visible colorants 340 [C, M, Y, K] and spectral edge markers 320 [$m_1, m_2, m_3, \ldots$] having spectral characteristics that can be detected by an image capture device 250.

Printer controller 550 operates printer 500 based upon input signals from a user input system 560, sensors 562, a memory 564 and a communication system 566. User input system 560 can comprise any form of transducer or other device capable of receiving an input from a user and converting this input into a form that can be used by printer controller 550. Sensors 562 can include contact, proximity, electromagnetic, magnetic, or optical sensors and other sensors known in the art that can be used to detect conditions in the printer 500 or in the environment-surrounding printer 500 and to convert this information into a form that can be used by printer controller 550 in governing printing, finishing or other functions.

Memory 564 can comprise any form of conventionally known memory devices, including but not limited to optical, magnetic or other movable media as well as semiconductor or other forms of electronic memory. Memory 564 can contain for example and without limitation image data, print order data, printing instructions, suitable tables and control software that can be used by printer controller 550.

Communication system 566 can comprise any form of circuit, system or transducer that can be used to send signals to, or receive signals from, memory 564 or external devices that are separate from, or separable from, direct connection with printer controller 550. External devices can comprise any type of electronic system that can generate signals bearing data that may be useful to printer controller 550 in operating printer 500. Printer 500 further comprises an output system 568, such as an electronic display 240 with a display screen, audio signal source, or tactile signal generator, or any other device that can be used to provide human perceptible signals by printer controller 550 to feedback, informational or other purposes.

Printer 500 prints images and text based upon print order information, including as provided by a print specification 580 for printing spectral edge marker print matter 300, including cover work 110 with hidden data 220, and any adjacent printed content 575. Print order information can include image data for printing and printing instructions from a variety of sources. In the embodiment of FIG. 11, these sources include memory 564 and communication system 566, from which printer 500 can receive such image data. Print order information can also be generated by way of user input system 560 and output system 568 and can be calculated by printer controller 550. For convenience, these sources are referred to collectively herein as source of print order information 570. It will be appreciated, that this is not limiting and that source of print order information 570 can comprise any electronic, magnetic, optical or other system known in the art of printing that can be incorporated into printer 500 or that can cooperate with printer 500 to make print order information or parts thereof available.

In the embodiment of printer 500 that is illustrated in FIG. 11, printer 500 has a data processor 540. In this data processor 540 has an optional color separation image processor 545 to convert the image data into color separation images that can be used by printing stations of print engine 520 to generate toner images. An optional half-tone processor 547 is also shown that can process the color separation images according to any half-tone screening requirements of print engine 520.

Data processor 540 processes image data, including the cover work 110 and the hidden data 220, as necessary to convert image data and any printing instructions into signals that can be used by printer controller 550 or print engine 520 to print, with the intent of printing at least the spectral edge marker printed matter 300, principally comprising cover work 110 and hidden data 220, in accordance with the print specification 580. Data processor 540 can be used to process data in other ways according to printing instructions received with print order data or with user input received through user input system 560. Data processor 540 can be integrated with other components of printer 500 or data processor 540 can be separate there from and can in one embodiment comprise a digital front end that can be used to allow a user to edit, modify, add or control printing operations.

The printer 500 shown in FIG. 11 can be a desktop or mid-market printer, such as an inkjet or printer that uses one or more inkjet printheads (not shown) to print on the receiver 510, which can include cut sheet paper. As another example, printer 500 can be a high speed print engine and receiver transport system that cooperates to deposit ink or another donor material on a fast moving generally continuous web of receiver. The inkjet printheads can be of the type used for continuous inkjet printers, where ink flows continuously through the nozzles of the printhead and provides streams of fluid, which break into ink droplets. The droplets are either allowed to fall onto the receiver 510, or are deflected to an ink catcher for locations where no ink should be applied to the printed page. The inkjet printheads can also be drop-on-demand printheads which only produces drops as they are needed. Printer 500 typically has four printing stations, although it may have more. For example, the first three printing stations apply cyan, magenta, and yellow inks, respectively, and the fourth printing station applies an ink bearing a spectral edge marker 320. Alternately, these print stations can deposit different colored inks, such as red, green, or blue inks. In some embodiments, one or more additional print stations can be added to apply additional inks such as a black ink (for example to have a CMYK printer) or another ink bearing a spectral edge marker 320.

It should also be understood that while FIG. 11 was discussed relative to the use of inkjet printing technology; for the purposes of the present invention, other technologies can also be used to apply both the normal process inks (or visible colorants 340) and the spectral edge markers 320 (or the inks bearing them). For example, printer 500 can use a variety of printing technologies including but not limited to inkjet, electro-photographic, offset litho, dry offset, letterpress, gravure, flexography, or screen printing to apply inks or dry inks such as toners to a receiver. Similarly, it will be appreciated that electrophotographic and other forms of toner printing, phase change toner printing, wax printing. Thermal transfer printing can be used as can any other form of printing that can form patterns of normal process spectral markers and the spectral edge markers 320 used for the present invention. Moreover, different printing technologies can be used to print the image content having normal process inks (or visible colorants 340) compared to that for the spectral edge markers 320. For example, the normal process inks can be printed using continuous inkjet or electro-photographic technologies, while the spectral edge markers 320 are printed using drop-on-demand inkjet technology.

Figure 12:
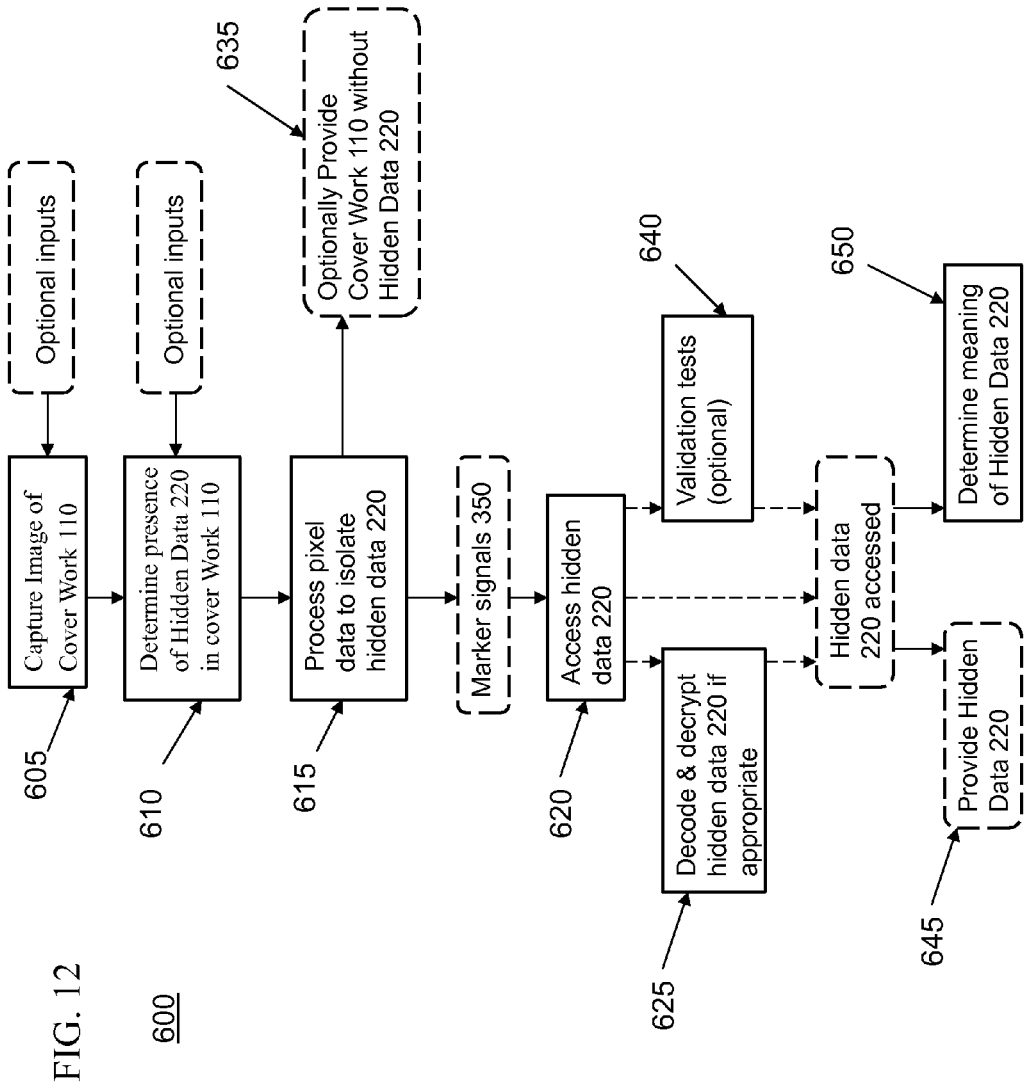
FIG. 12 depicts an exemplary spectral edge marker detection process.

FIG. 12 describes a process by which a system comprising an image capture device 250 and a print matter 300 having a cover work 110 using spectral edge markers 320 to provide hidden data 220 can detect that hidden data in the print matter content. In particular, the exemplary spectral edge marker detection process 600 begins with an image capture step 605. A user may be directing image capture device 250 at the spectral edge marker printed matter 300 without knowledge of the presence of hidden data 220. Alternately, the user may be informed of the presence of hidden data 220 by an accompanying icon, an audio signal, or by expectation (e.g., an optional input). In the first case, a visual icon can accompany the printed matter to inform or alert the consumer image capture device 250 to the presence of a hidden pattern to be detected. Of course, this visual icon should be small and unobtrusive, for example, as compared to a QR code. In the second case, for example, visitors can be advised to direct image capture devices 250 at images in an art gallery or museum, to acquire accompanying hidden data 220 from the displays.

Subsequently, the captured images are image processed to detect the presence of the hidden data 220 in the cover work 110. For example, hidden data detection step 610 can include detecting image attributes or statistics indicative of the presence of hidden data 220, or detecting the presence of an accompanying icon. Further image analysis can determine whether hidden data 220 cover is provided throughout work 110, or in select image areas, and in the latter case, generally isolate the locations thereof. In the case that the user has image capture device in a hidden data detection mode, then the hidden data detection step 610 can skip directly to the location determination exercise. Hidden data detection step 610 can also include steps to correct for rotation and scale of the cover work 110 and the hidden data 220, which can vary depending on pointing of the image capture device 250. An exemplary method is provided in commonly assigned U.S. Pat. No. 6,567,532 (Honsinger). Other capture condition corrections, such as for brightness or image resolution variation, can be applied as needed.

As seen in FIG. 12 a subsequent hidden data identification step 615 then analyzes the identified image areas to yield marker signals 350 that essentially isolate shapes, contours, pixel densities that indicate the actual numerical, textual, or image data that represents the message. As one outcome, subsequent clean digital image step 635 can provide image processing to remove the hidden data 220 from the captured image 270, and provide an output image representing a first appearance state 285 corresponding to the content of the cover work 110 only. Hidden data interpretation step 620 then "reads" or accesses the hidden data 220, by assembling the pixel signals 350 into numerical, textual, or image data. In the case that the message is encrypted and encoded (See FIG. 1), then an optional subsequent hidden data translation step 625 can provide decoding and decryption of the marker signals 350 for identified hidden data 220, again resulting in accessed hidden data 220. During an optional validation step 640, the probabilities of a false positive or false negative reading of the hidden data 220 can be measured using confidence values. The resulting confidence values can be reported to the user, or used to initiate further image capture or image analysis. In subsequent report hidden data step 645, the accessed, decoded, or decrypted hidden data 220 can be reported to a user, for example through an electronic display 240, or played as an audio file through a speaker, or by other methods. In the determine meaning of hidden data step 650, the meaning of the accessed, decoded, or decrypted hidden data 220 can be determined by a computer, or directed to or accessed from a website address, or determined by other methods.

The hidden data identification step 615 of FIG. 12 can be accomplished by various methods. When an image of the cover work 110 and the embedded hidden data 220 is acquired by image capture device 250, an imaged color camera response 280 is produced by the combination of the native camera spectral response 260 and the spectra of the light that reflected from the print matter 300. This imaged color camera response 280 includes three spectral signals; blue pixel signal 281$b$, green pixel signal 281$g$, and red pixel signal 281$r$ (e.g., FIGS. 6b-6c, and FIGS. 8b, 8d). Operation of the image sensor 258 inherently produces spectrally integrated versions of these red, green, and blue pixel signals (281r, 281g, and 281b). Subsequent image processing (245) within hidden data identification step 615 of one or more of these pixel signals can then provide marker signals 350 that reveal hidden data 220. For example, this process can involve identifying image contours and luminance differences between image locations or pixels having both visible colorant 340 and spectral edge markers 320 compared to adjacent image areas 305 with only visible colorants. For example, if UV edge markers 325 are being used at the UV-blue spectral edge 262, then differences in the integrated blue pixel signals 281b can indicate the two type of pixels (with or without UV edge markers 325). A test to isolate potential spectral edge marker pixels can also test for small color matching differences of the integrated blue pixel signals 281b compared to the adjacent image areas 305. As noted before, depending on the UV edge markers 325 and visible colorants used, these signal differences can be only a few percent, or much larger (multiples). Then hidden data identification step 615 can employ a mapping function to assemble shapes or contours of spectral edge marked pixel locations that are distinct from adjacent image content. The resulting data can be modified for delivery to a user (step 645). Alternately, hidden data identification step 615 can employ shape recognition algorithms or character recognition algorithms to interpret the mapped spectral edge marked pixel locations as text, numbers, or shapes. For example, a serial number or web address can be recognized and then acted upon (step 650). In the cases that the spectral edge markers 320 and visible colorants supply sufficient density difference to support bit depth, then the hidden data 220 needs to be isolated and identified with interpretation of the code values.

The analysis of hidden data identification step 615 can use other methods. For example, if spectral edge markers 320 are used at both the UV-blue spectral edge 262 and the red-IR spectral edge 264, a correlation of integrated blue pixel signals 281b and integrated red pixel signals 281r can be used to identify pixel wise marker signals 350. These dual spectral edge signals can also be used additively, subtractively, or with other functional dependencies to derive marker signals 350. As another example, a spectral edge marker 320 at a single spectral edge can be considered as a grey scale image. When spectral edge markers 320 are used at both the UV-blue spectral edge 262 and the red-IR spectral edge 264, derived marker signals 350 could be rendered with false colors to reveal hidden data 220.

Detection of hidden data 220 for a digital watermark or steganography using the spectral edge marking method of the present invention depends on spectral properties of the spectral edge markers 320, the visible colorants 340, the image capture device 250, and light provided by the illuminant 295. As discussed previously, the spectral edge marker 320, whether a UV edge marker 325 or an IR edge marker 330, needs to match with the image capture device spectral response 280 of the image capture device 250 to produce a useful imaged color camera response (including image processing) capable of revealing a hidden pattern 220. In the case of a user operating a mobile phone or smart phone aiming the device at an image or cover work 110 (e.g., an advertising poster), where the embedded image capture device 250 is both size and cost constrained, the result is a detectable signal revealing the hidden pattern 220, that is significantly defined by the spectral attributes of the IR filter 256 and the spectral edge marker 320. As the results of FIGS. 6a-6c and FIGS. 8a-8e indicate, depending on the spectra involved, the signal difference between for a printed color patch with a spectral edge marker 320 and an adjacent printed color patch without it, as seen by the image capture device 250, or given pixels therein (e/g., selected blue pixels response 261b) can be <1% signal difference to ~2.5× signal difference or more. Certainly, hidden data 220 provided with the former signal differences will be harder for the hidden data detection signal processing to discern than with the latter signal differences. Detection of hidden data 220 printed with spectral edge markers 320 can occur as either informed detection (with foreknowledge of the hidden data 220) or as blind detection (without foreknowledge).

It is recognized that the image capture device 250 can be a more capable device than a mobile phone, relative to the qualities of the embedded optical system, the digital processing, or other accessories. For example, the image capture device 250 can be equipped with an IR filter 256 with a broader bandpass, such as the exemplary IR filter 256c of FIG. 3c. As the discussion associated with the FIGS. 6a-6c and FIGS. 8a-8e results suggested, the signal difference increases if the image sensor signal integration favors a more limited spectral range, such the 380-410 nm spectral range within the UV-blue spectral edge 262. Greater signal differences, such as that provided in the examples of FIGS. 6a, 6b, can provide greater print latitude in embedding hidden data 220 in cover work 110 with varying image content, or provide greater bit depth and data capacity. This can be accomplished in various ways. For example, the image capture device 250 can provide a tilting mechanism, operated by controller 230, to tilt IR filter 256, as suggested in FIG. 3a. In particular, it is known that tilting a bandpass filter will shift its low wavelength pass band cutoff to shorter wavelengths and expand the pass band. For example, a 15 degree tilt of IR filter 256 with a short wavelength cut-off at 400 nm (e.g., filter 256c of FIG. 3c) will shift the cutoff to shorter wavelengths, to ~392 nm. Thus, IR filter 256 can be tilted to provide a shorter wavelength cut-off during sensing of a digital watermark or hidden data 220, and then returned the nominal normal position (perpendicular to the optical axis 251) during normal imaging. Thus signal related to a UV edge marker 325 would have greater weighting.

Alternately, image capture device 250 can include a secondary optical filter 257 with a narrower band pass, for example, transmitting 380-430 nm light, that would favor signal related to a UV edge marker 325. However, providing a sliding mechanism and moving optical filter 257, operated by controller 230, within the housing 252 of a consumer image capture device 250 (see FIG. 3a), would likely be prevented by space, cost, and reliability reasons. As another alternative, optical filter 257 can be a tunable optical filter device whose band pass can be electro-optically modified in response to an applied signal from controller 230. Image capture device 250 can also optionally include a light source or illuminant 295, which can for example, be attached to housing 252. As an example, illuminant 295 can provide light within the UV-blue spectral edge 262 that can enhance detection of hidden data 220 printed with UV edge markers 325 by image capture device 250, where this light would be invisible or marginally visible to a human observer if the light spectrum was provided primarily below 400 nm. As a particular example, illuminant 295 can be a LED emitting a UV light distribution centered at 375 nm, where light above ~395 nm is blocked by an optical filter to reduce the risk of human perception. The risk of human perception is also reduced if the image capture device 250 is operated in ambient room light or day light conditions where the comparatively high visible light intensity and photopic eye adaptation of the human observers would bias against perception of light from illuminant 295. Of course, IR light sources can be used in combination with IR edge markers 330 and image capture device 250 for similar effect.

The circumstance of detection of more complicated hidden data 220 printed with spectral edge markers 320 and then detected by an image capture device 250 with more capability than a cell phone can still be a consumer application. However, as the printing technique using spectral edge markers 320 and the detection technique using image capture devices 250 becomes increasingly specialized, the opportunities for embedding hidden data 220 in images for other purposes, such as security or authentication watermarking, also increases. Essentially, a transition from watermarking applications to steganographic applications occurs as more specialized equipment is required.

Figure 13:
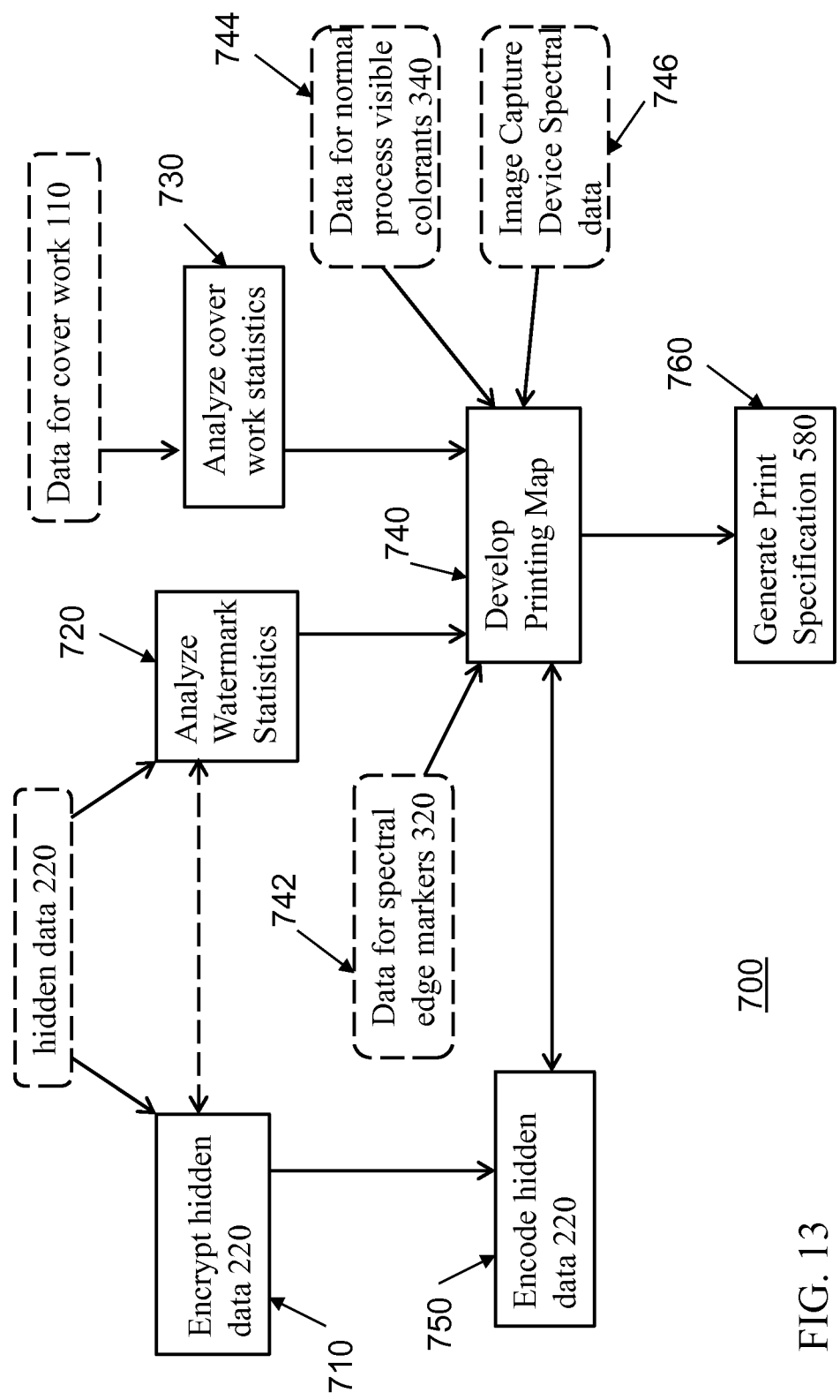
FIG. 13 depicts and exemplary spectral edge marker data hiding process.

Obviously, prior to printing cover work 110 with hidden data 220, and then conducting spectral edge marker detection process 600, a method is required for providing hidden data 220 using spectral edge markers 320. In particular, FIG. 13 provides an exemplary spectral edge marker data hiding process 700 for creating spectral edge marker printed matter 300. Input data, including data for cover work 110 and hidden data 220 is first provided. In one path, hidden data is prepared via an optional coding and encryption step 710 as needed. In parallel, an image processor 245 can undertake the analyze hidden data statistics step 720, to analyze the data capacity required of the hidden data 220 and the space required within cover work 110 for various data hiding scenarios. Other parameters, related to data replication, spatial data packing, or signal loss rick, can also be assessed. Optionally, the analyze hidden data statistics step 720 can assess the watermark data for the encrypted hidden data 220 provided by coding and encryption step 710. The image processor 245 can likewise analyze the cover work 110 per analyze cover work statistics step 730 to determine the data hiding capacity of the cover work for different data hiding scenarios. In subsequent develop printing map step 740, a printing map is developed that specifies how and where hidden data 220 can be hidden in the cover work 110, based upon the analyzed statistics for the hidden data 220, the cover work 110, and the spectral properties of the spectral edge markers 320 and the visible colorants 340. The output from the develop printing map step 740 can be directed to an encoding hidden data step 750, which can specify the amount of spectral edge markers 320 to print in given pixel positions within the cover work 110, such that hidden data 220 can be provided. Both the encoding hidden data step 750 and the develop printing map step 740 can specify the printing of the visible colorants, depending on whether spectral edge markers 320 are present or not. Color management for the printing of the spectral edge markers 320 and the visible colorants 340 can be accomplished using conventional methods, such as those described in "*The Reproduction of Colour, Sixth Edition*" by R. W. G. Hunt, by Fountain Press Ltd. (2004), and the "*Digital Color Imaging Handbook*" by Gaurav Sharma, CRC Press (2003). In the present embodiment, the amount of each colorant is determined using optimization techniques, for which spectral (absorbance or reflectance) or colorimetric data describing the colors. Included in either of encoding hidden data step 750 or the develop printing map step 740 can be a color matching check, to determine that the combination of spectral edge markers 320 and normal colorants 340 will appear color matched to the original pixel position colors, within a determined color difference tolerance (e.g., JNDs). For an image content area, quantities of visible colorants 340 to pixels having spectral edge markers 320 can be modified to improve color matching to the original specified color for that pixel or to the color of nearby pixels having only visible colorants 340. For example, if the visible crosstalk of the spectral edge marker 320 imparts a slight green coloration, the amount of green normal print process colorant can be reduced slightly to compensate. Subsequent generate print specification step 760 creates an overall nominal print specification 580 for the visible colorants 340 and the spectral edge markers 320 using the results of encoding hidden data step 750 and the develop printing map step 740 as inputs. Print specification 580 can be an image file with specialized metadata, a set of raster image process (RIP) print files that are adapted to the printer, and the print map that indicates the type of colorants with image position, and the actual visible colorants 340 or spectral edge markers 320 [C, M, Y, K, $m_1$, $m_2$, $m_3$, . . . ] used, and the quantity or density thereof.

In completing the develop printing map step 740, capacity of hidden data 220 depends on the analyzed hidden data and cover work statistics and spectral data. Data for the spectral edge markers 320 and the visible colorants 340 can be accessed from a spectral edge marker database 742 and a visible colorants database 744, respectively. For example, capacity for hidden data 220 in cover work 110 can depend on whether spectral edge markers 320 are being used at the UV-blue spectral edge 262, the Red-IR spectral edge 264, or both. Likewise, capacity for hidden data 220 can also depend on whether the visible colorants 340 have low absorbance at the UV-blue spectral edge 262, the Red-IR spectral edge 264, or both. Additionally, capacity for hidden data 220 can depend on spectral details of the spectral edge markers 320, such as the spectral position of the marker toe absorption 335. An image capture device database 746 can also provide input for an assumed camera response (e.g., speed (F-number), spectral transmission, and illuminant spectra). Taken together, using a combination of these inputs, the develop printing map step 740 can determine whether the desired hidden data 220 can be stored in cover work 110 or not, and if so, where and under what conditions. The encoding hidden data step 750 then undertakes the encoding task and returns data to develop printing map step 740 for the selection and quantity of spectral edge markers 320 by pixel position.

If the print mapping step (740) indicates a reasonable dynamic range or print latitude for providing hidden data 220 into cover work 110 with a density variation of spectral edge markers 320 capable of supporting significant bit depth, then encoding hidden data step 750 can be encoded with density based code values, much like conventional images. However, if the density variation of spectral edge markers 320 is more limited, encoding hidden data step 750 can use alternate encoding methods, including various standard approaches provided in the previously mentioned book "*Digital Watermarking*", by I. Cox et al. These can include a spread-spectrum method using additive modification embedded in the frequency domain, quantization methods, or amplitude modulation with additive modifications embedded in the spatial domain.

It is noted that although the method of the present invention for hiding data 220 in the cover work 110 of print matter 300 preferentially uses non-fluorescing spectral edge markers 320, this method can be used in combination with stimulus responsive materials or colorants. In essence, if such materials are present, an external stimulus can be applied to change a spectral state (e.g., color or absorption spectrum, light emission) of one or more stimulus responsive materials, so as to hide or reveal hidden data printed with spectral edge markers 320. These materials can include UV, IR, or visibly fluorescing inks, chromogenic inks (change color with stimulus) or other materials. Chromogenic inks, as a class, include both thermochromic colorants (change color with temperature change) and photochromic colorants (change color with light stimulus). As an example, use of a color changing ink that provides an absorption change within the UV-blue spectral edge 262 or the Red-IR spectral edge 264, can complement the spectral edge marker(s) 320 (325, 330), such that a spectral edge marker 320 can be detected by an image capture device 250 during one chromogenic colorant state, but not during another. For example, Reversacol photochromic dyes, manufactured by Vivimed Labs of Hyberbad, India, can be used for this purpose. Thermochromic dyes or inks that can be used for mutable colorants in various embodiments of the present invention are commercially available from many companies, including Chromatic Technologies International of Colorado Springs, Colo., LCR Hallcrest of Glenview, Ill., and Printcolor Screen Ltd. of Berikon, Switzerland. Similarly, piezochromic (pressure sensitive) colorants, electrochromic colorants, hydrochromic (moisture sensitive) colorants, or halochromic (pH sensitive) colorants, can also be used for various embodiments. Fluorescent materials can be used for similar purposes, if printed near or with the UV edge markers 325. For example, a fluorescent marker that is stimulated by UV light λ<360 nm can fluoresce to produce light in the spectra range of the UV-blue spectral edge 262 (375-425 nm). Unless this fluorescence is quenched, it will be hard to see the hidden data 220 printed with UV edge markers 325. Of course, it helps if the UV edge markers 325 have a reduced light absorptance below 360 nm. It is noted that the complexity provided by using stimulus responsive materials in conjunction with spectral edge markers 320 can be valuable for either steganographic or watermarking applications.

It is also noted that the of the present invention for hiding data 220 in the cover work 110 of print matter 300 by use of spectral edge markers 320 is distinct from metameric color matching methods, such as those provided by previously mentioned U.S. Pat. No. 8,064,100 (Braun et al.). For example, Braun et al. relies on metameric color matching to hide watermarks and metameric failure to reveal them. That is, with metameric spectra, very different reflectance spectra (see Braun, FIGS. 5-8) can provide the same color appearance under one visible spectral illuminant, but rather different color appearances when subjected to a different visible spectral illuminant (metameric failure). In contrast, the present invention uses spectral edge markers 320 that provide significant light absorption just outside the visible spectrum, but which only perturb the visible absorption, such that when coupled with a visible colorant 340, color appearance is nearly identical with or without the spectral edge markers 320. This is shown in various examples of the present invention, including those associated with FIGS. 6a, 6c and FIGS. 8a, 8c. This near color matching does not rely on metameric color matching and is obtained whether the print matter 300 is illuminated with white light, or with narrower spectra of a color band or partial color band, as the spectral differences for the two spectral absorptance cases are so small within the visible spectrum.

As generally described, the method of the present invention provides robust watermarks or hidden data 220, in that the spectral edge markers 320 can provide a large dynamic range or density difference AD that makes the hidden data readily detected by an image capture device 250, and increases data capacity. For example, hidden data 220 embedded in a cover work 110 that is a concert advertising poster can carry information about a concert event (e.g., venue, date, musician information, ticket seller information, websites) that is readily detected by a consumer imaging device.

Alternately, the method of the present invention can provide fragile watermarks or steganographic hidden data 220 with the cover work 110. As one idealized approach, hidden data 220 provided with spectral edge markers 320, would be readily detected by informed users, but not readily detected and/or replicated by other users. As a simplistic approach, if the spectral edge markers 320 are not widely available, replication can be difficult, even if the hidden data 220 is detected. Alternately, the hidden data 220 can be fashioned as a fragile watermark by increasing the difficulty of detecting the hidden data in part or in entirety. In particular, this can be accomplished by deliberately reducing the dynamic range or density difference ΔD with which the hidden data 220 is embedded in the cover work 110. There are several methods for accomplishing this goal. In the case of the exemplary spectral edge marker data hiding process 700 of FIG. 13, analysis of the watermark statistics (step 720) and the cover work statistics (step 730) can be used to develop a print map and print specification 580 to select image content areas where the image content has high print densities from the visible colorants 340, and the density difference $\Delta D_1$ between the visible colorants 340 and the spectral edge markers 320 in the spectral edge regions (262 or 264) are reduced. This effect can be accentuated by the selection of the visible colorants 340. For example, as noted previously, printing with visible colorants 340 that are common inkjet inks (FIG. 7) that tend to have significant light absorption in the spectral edge regions (e.g., cyan and yellow at the UV-blue spectral edge 262), can reduce the density difference $\Delta D_1$ obtained with the spectral edge markers 320. Alternately, for fragile watermarking, spectral edge markers 320 can be selected to push their light absorption peak towards the far edge of the spectral edge region. For example, by using a UV spectral edge marker 325 with a marker signal absorption 333 and marker toe absorption 335 at the UV-blue spectral edge 262 that is further from the blue pixels response 261b of the image capture device 250 (closer to 375 nm than 425 nm), the signal discrimination or density difference $\Delta D_1$ can be reduced. For example, it can be useful to reduce the signal difference detected by the image capture device 250 (e.g., the blue pixels response 261b) to a few % or less, or $\Delta D_1 < 0.05$. In such cases, the image capture devices 250 for the informed users can employ methods such as signal correlations or dynamic filtering (electronic or optical (e.g., tilting IR filter 256)) to aid detection of such fragile watermarks. For example, the image capture device 250 can be a scanning spectral densitometer.

It should be understood that the method of the present invention for hiding data 220 in the cover work 110 of print matter 300 by use of spectral edge markers 320 does not only apply to digital techniques involving pixel addressing, as suggested most explicitly in FIG. 2c. In particular, whether for steganographic or watermarking purposes, the spectral edge markers 320 can be applied to the print media 200 by analog methods. As one example, spectral edge markers 320 can be printed on the print media 200 using a pen, whether by hand or using a mechanical device. As another example, spectral edge markers 320 can be dyed into a thread, with or without visible colorants 340, and woven into currency as an authentication feature.

The invention has been described in detail with particular reference to certain preferred embodiments thereof, but it will be understood that variations and modifications can be effected within the scope of the invention.

PARTS LIST 100 watermarking process
105 message
110 cover work
115 encrypted message
120 encoded message
125 reduced amplitude encoded message
130 embedded message
140 watermarked work
200 print media
210 image
220 hidden data
220a-220f hidden data
230 controller
235 memory
237 interconnects
240 electronic display
245 image processor
250 image capture device
251 optical axis
252 housing
254 lens
255 image light
256 IR filter
256a-256c IR filter
257 optical filter
258 image sensor
260 native camera spectral response
261r red pixels response
261g green pixels response
261b blue pixels response
262 UV-blue spectral edge
264 Red-IR spectral edge
266 color matching functions
270 captured image
275 digital image of hidden data
280 imaged color camera response
281r red pixel signal
281g green pixel signal
281b blue pixel signal
285 first appearance state
290 second appearance state
295 illuminant
300 spectral edge marker printed matter
302 pixel
305 adjacent image area
310 visible band
320 spectral edge marker
325 UV edge marker
330 IR edge marker
333 marker signal absorption
335 marker toe absorption
337 broad visible marker absorption
340 visible colorant
342 absorption spectrum
344 combined absorption spectrum
350 signal
360 magenta ink
362 cyan ink
364 yellow ink
400 encapsulated ink particle
410 flake particle
415 dispersed particle
420 core shell particle
430 visible optical layer
435 visible dye layer
440 spectral edge marker layer
500 printer
510 receiver
520 print engine
525 print stations
530 receiver transport system
540 data processor
545 color separation image processor
547 half tone processor
550 printer controller
560 user input system
562 sensors
564 memory
566 communication system
568 output system
570 print order information
575 adjacent printed content
580 print specification
600 spectral edge marker detection process
605 image capture step
610 hidden data detection
615 hidden data identification
620 hidden data interpretation
625 hidden data translation
635 clean digital image
640 validation step
645 report hidden data
650 determine meaning of hidden data
700 spectral edge marker data hiding process
710 encryption
720 analyze hidden data statistics
730 analyze cover work statistics
740 develop printing map
742 spectral edge marker database
744 visible colorant database
746 image capture device data
750 encoding hidden data
760 generate print specification

The invention claimed is:

1. A system for detecting visibly hidden content on a print media, comprising:
a print media printed with image content comprising one or more visible colorants;
the print media further printed with at least one spectral edge marker material onto at least one image region of the print media to provide visibly hidden data, wherein the spectral edge marker material has a substantial spectral absorption just outside the human visible spectrum, and a comparatively much reduced absorption within the human visible spectrum;
an image capture device having a visible spectral response which includes both red, green, and blue spectrally distinct imaging channels and an overall spectral response including a spectral region just outside the visible spectrum;
wherein the at least one visible colorant is printed on the print media in regions that are both overlapping with and adjacent to the image regions having the at least one selectively printed spectral edge marker material, such that image regions having only the at least visible colorant and the image regions having the at least one selectively printed spectral edge marker material and the at least one visible colorant are color matched; and
wherein the image capture device detects the at least one spectral edge marker material ink using at least one spectrally distinct color imaging channel having a spectral response inclusive of a bandwidth of at least a portion of the substantial spectral absorption just outside the human visible spectrum of the at least one spectral edge marker material.

2. The system of claim 1 wherein color matching of image content printed with the spectral edge markers and visible colorants compared to adjacent image regions printed with only visible colorants is comparable within two Just Noticeable Differences (JNDs).

3. The system of claim 1 wherein color matching of image content printed with the spectral edge markers and visible colorants compared to an original color specified for that image content when printed with only visible colorants is comparable within two Just Noticeable Differences (JNDs).

4. The system of claim 1 wherein color changes caused by visible crosstalk from the comparatively much reduced absorption of the spectral edge marker materials in the visible spectrum is substantially masked by the presence of the visible colorants.

5. The system of claim 1 wherein the spectral edge marker materials are UV absorbers, IR absorbers, or both, wherein these absorbers are not visibly fluorescing.

6. The system of claim 5 wherein the UV absorbing spectral edge markers provide significant light absorption within a spectrum spanning 370-420 nm.

7. The system of claim 5 wherein the IR absorbing spectral edge markers provide significant light absorption within a spectrum spanning 670-725 nm.

8. The system of claim 1 wherein image data obtained by the image capture device is processed to isolate pixel data corresponding to detected hidden data printed with the at least one spectral edge marker materials from surrounding image data that was printed without the spectral edge marker materials.

9. The system of claim 1 wherein the at least one spectral edge marker materials comprise embedded encapsulated particles such that the spectral edge markers are contained within an outer visible light modifying layer.

10. The system of claim 9 wherein the encapsulated particles are flakes, core-shell, or dispersed materials.

11. The system of claim 9 wherein the visible light modifying layer significantly alters incident visible light by absorption or reflection while having little impact on transiting UV or IR light.

12. The system of claim 1 wherein an IR filter associated with the image capture device is tilted to modify a spectral position of the IR filter pass band.

13. The system of claim 1 wherein a light source provides illuminating light having a light spectrum comprising at least part of the spectral edge bandwidth corresponding to the at least one spectral edge marker materials.

14. The system of claim 13 wherein the illuminating light spectrum does not include visible light.

15. The system of claim 1 wherein one or more of the visible colorants lack significant light absorption within at least one spectral edge region, including the Red-IR spectral edge or UV-Blue spectral edge.

16. The system of claim 1 wherein the visibly hidden data is provided digitally, by analog printing methods, or combinations thereof.

17. The system of claim 1 wherein the visibly hidden data is further hidden by selective printing of stimulus responsive materials onto the print media.

18. The system of claim 17 where an external stimulus is applied to change a spectral state of one or more stimulus responsive materials, so as to hide or reveal hidden data printed with the at least one spectral edge marker materials.

19. The system of claim 17 wherein these stimulus responsive materials comprise a group including at least one of UV fluorescing inks, IR fluorescing inks, visibly fluorescing inks, or chromogenic colorants.

20. The system of claim 19 wherein the chromogenic colorants comprise a group including at least one of photochromic colorants, thermochromic colorants, piezochromic colorants, or combinations thereof.

21. The system of claim 1 wherein the visible colorants are selected from a group including at least cyan, magenta, yellow, red, green, blue, and black colorants.

22. The system of claim 1 wherein the visibly hidden data provided with the image content provides a robust watermark.

23. The system of claim 1 wherein the image content consists of at least one of images, text, colored fields, grey fields, or combinations thereof.

24. A system for detecting visibly hidden content on a print media, comprising:
  a print media printed with image content comprising one or more visible colorants;
  printing of at least one spectral edge marker material onto at least one image region of the print media to provide visually hidden data, wherein the spectral edge marker material has a substantial spectral absorption just outside the human visible spectrum;
  an image capture device having a visible spectral response which includes both red, green, and blue spectrally distinct imaging channels and an overall spectral response including a spectral region just outside the visible spectrum;
  wherein the at least one visible colorant is printed on the print media in regions that are both overlapping with and adjacent to the image regions having the at least one selectively printed spectral edge marker material, such that image regions having only the at least one visible colorant and the image regions having the at least one selectively printed spectral edge marker material and the at least one visible colorant are color matched;
  wherein the image capture device detects the at least one spectral edge marker material ink using at least one spectrally distinct color imaging channel having a spectral response inclusive of at least a portion of the spectral absorption of the at least one spectral edge marker material;
  wherein color changes caused by visible crosstalk from the spectral edge marker materials in the visible spectrum is substantially masked by the presence of the at least one visible colorant; and
  wherein the at least one visible colorant has a significant visible light absorption but also a comparatively low optical absorption within at the least a portion of a bandwidth of the at least one spectral edge absorber marker materials that has the substantial spectral absorption.

25. A system for detecting visibly hidden content on a print media, comprising:
  a print media printed with image content comprising one or more visible colorants;
  printing of at least one spectral edge marker material onto at least one image region of the print media to provide visually hidden data, wherein the spectral edge marker material has a substantial spectral absorption just outside the human visible spectrum;
  an image capture device having a visible spectral response which includes both red, green, and blue spectrally distinct imaging channels and an overall spectral response including a spectral region just outside the visible spectrum;

wherein the at least one visible colorant is printed on the print media in regions that are both overlapping with and adjacent it to the image regions having the at least one selectively printed spectral edge marker material, such that image regions having only the at least one visible colorant and the image regions having the at least one selectively printed spectral edge marker material and the at least one visible colorant are color matched;

wherein the image capture device detects the at least one spectral edge marker material ink using at least one spectrally distinct color imaging channel having a spectral response inclusive of at least a portion of the spectral absorption of the at least one spectral edge marker material;

wherein color changes caused by visible crosstalk from the spectral edge marker materials in the visible spectrum is substantially masked by the presence of the at least one visible colorant; and wherein optical absorption of the at least one visible colorant, as denoted by an optical density difference ($\Delta D$), is less absorbing than the spectral edge marker materials in at least a portion of a common spectral bandwidth just outside the human visible spectrum, by a density difference $\Delta D \geq 0.2$.

* * * * *